US010652927B2

(12) United States Patent
Oh et al.

(10) Patent No.: US 10,652,927 B2
(45) Date of Patent: May 12, 2020

(54) METHOD AND APPARATUS FOR IDENTIFYING UPLINK SIGNAL TRANSMISSION TIMING IN WIRELESS COMMUNICATION SYSTEM

(71) Applicant: Samsung Electronics Co., Ltd., Suwon-si, Gyeonggi-do (KR)

(72) Inventors: Jinyoung Oh, Seoul (KR); Sungjin Park, Incheon (KR); Jeongho Yeo, Hwaseong-si (KR); Youngwoo Kwak, Suwon-si (KR); Youngbum Kim, Seoul (KR); Taehyoung Kim, Seoul (KR); Hoondong Noh, Suwon-si (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 15/971,411

(22) Filed: May 4, 2018

(65) Prior Publication Data

US 2018/0324861 A1 Nov. 8, 2018

(30) Foreign Application Priority Data

May 4, 2017 (KR) .......................... 10-2017-0056845

(51) Int. Cl.
*H04W 74/08* (2009.01)
*H04W 48/08* (2009.01)
(Continued)

(52) U.S. Cl.
CPC ....... *H04W 74/0825* (2013.01); *H04L 5/0078* (2013.01); *H04W 48/08* (2013.01);
(Continued)

(58) Field of Classification Search
CPC ..... H04W 16/14; H04W 48/08; H04W 48/16; H04W 72/04; H04W 72/12;
(Continued)

(56) References Cited

U.S. PATENT DOCUMENTS 9,253,799 B2 * 2/2016 Taori ................. H04W 74/0808
9,717,071 B2 * 7/2017 Chen ................. H04W 72/1215
(Continued)

FOREIGN PATENT DOCUMENTS

KR  10-2016-0045750 A   4/2016
KR  10-2016-0066903 A   6/2016
(Continued)

OTHER PUBLICATIONS

International Search Report dated Aug. 17, 2018, issued in International Application No. PCT/KR2018/005193.
(Continued)

*Primary Examiner* — Tri H Phan
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for internet of things (IoT). The disclosure may be applied to intelligent services based on the 5G communication technology and the IoT-related technology. The method of a terminal in a wireless communication system are provided. The method includes receiving information, which is related to a first transmission time and a second transmission time of an uplink signal of a terminal, from a base station, when the uplink signal of the terminal is configured in an unlicensed band, performing a channel access in the unlicensed band, and when the unlicensed band is not in an idle state based on a channel access result before
(Continued)

the first transmission time, performing a channel access until the second transmission time.

16 Claims, 14 Drawing Sheets

(51) Int. Cl.
| | |
|---|---|
| *H04W 48/16* | (2009.01) |
| *H04W 72/12* | (2009.01) |
| *H04W 74/00* | (2009.01) |
| *H04L 5/00* | (2006.01) |
| *H04W 16/14* | (2009.01) |

(52) U.S. Cl.
CPC ....... *H04W 48/16* (2013.01); *H04W 72/1289* (2013.01); *H04W 74/0808* (2013.01); *H04W 16/14* (2013.01); *H04W 74/006* (2013.01)

(58) Field of Classification Search
CPC ............. H04W 72/1289; H04W 74/00; H04W 74/006; H04W 74/08; H04W 74/0808; H04W 74/0825; H04W 72/0406; H04W 72/0413; H04W 72/1263; H04W 72/1268; H04W 72/1278; H04W 72/1284; H04W 74/04; H04W 74/0816; H04W 74/0833; H04W 74/0858; H04L 5/0078; H04L 5/0007

See application file for complete search history.

(56) References Cited

U.S. PATENT DOCUMENTS

| | | | | |
|---|---|---|---|---|
| 9,801,224 | B2* | 10/2017 | Taori | .................. H04W 74/0808 |
| 10,187,186 | B2* | 1/2019 | Chen | ..................... H04L 1/1861 |
| 10,368,363 | B2* | 7/2019 | Park | ..................... H04B 7/0452 |
| 10,499,426 | B2* | 12/2019 | Oh | ..................... H04W 74/0808 |
| 2015/0049712 | A1 | 2/2015 | Chen et al. | |
| 2015/0334744 | A1 | 11/2015 | Ji et al. | |
| 2016/0095134 | A1 | 3/2016 | Chen et al. | |
| 2017/0041912 | A1* | 2/2017 | Tanaka | .................. H04W 16/14 |
| 2018/0007674 | A1* | 1/2018 | Shimomura | ........ H04W 72/044 |
| 2018/0049241 | A1 | 2/2018 | Heo et al. | |
| 2018/0288790 | A1* | 10/2018 | Kim | .................. H04W 72/1278 |
| 2018/0317244 | A1* | 11/2018 | Um | ......................... H04L 5/001 |
| 2019/0132825 | A1* | 5/2019 | Tanaka | .................. H04W 16/14 |
| 2019/0191456 | A1* | 6/2019 | Koorapaty | ........ H04W 72/0446 |

FOREIGN PATENT DOCUMENTS

| | | |
|---|---|---|
| WO | 2016/054238 A2 | 4/2016 |
| WO | 2016/163973 A1 | 10/2016 |
| WO | 2016/185275 A1 | 11/2016 |

OTHER PUBLICATIONS

Extended European Search Report dated Jan. 27, 2020, issued in a counterpart European application No. 18795088.6-1205/3577990.
Ericsson: "Multiple starting and ending positions for LAA UL",3GPP Draft; R1-1705451 Multiple Starting and Ending Positions for LAA UL, 3rd Generation Partnership Project (3GPP), Mobile Competence Centre ; 650, Route Des Lucioles ; F-06921 Sophia-Antipolis Cedex, vol. RAN WG1, No. Spokane, USA; Apr. 3, 2017-Apr. 7, 2017 Apr. 2, 2017 (Apr. 2, 2017), XP051243581.
LG Electronics: "Discussion on multiple starting and ending positions for LAA UL", 3GPP Draft; R1-1704838 LAA UL, 3rd Generation Partnership Project (3GPP), Mobile Competence Centre ; 650, Route Des Lucioles ; F-06921 Sophiaantipolis Cedex ; France, vol. RAN WG1, No. Spokane, USA; Apr. 3, 2017-Apr. 7, 2017 Apr. 2, 2017 (Apr. 2, 2017), XP051242974.

* cited by examiner

METHOD AND APPARATUS FOR IDENTIFYING UPLINK SIGNAL TRANSMISSION TIMING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0056845, filed on May 4, 2017, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for setting and determining uplink signal transmission timing. More specifically, the disclosure relates to a method for allowing a base station to set uplink signal transmission timing of a terminal and determine the transmission timing, when the terminal is configured to perform the uplink signal transmission at one or more uplink signal transmission timings.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as devices, exchange and process information without human intervention. The internet of everything (IoE), which is a combination of the IoT technology and the Big Data processing technology through a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent services that create a new value by collecting and analyzing data generated among connected things. IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The 5G system has considered a support for various services compared to the existing 4G system. For example, the most representative services are an enhanced mobile broadband (eMBB) communication service, an ultra-reliable and low latency communication (URLLC) service, a massive machine type communication (mMTC) service, an evolved multimedia broadcast/multicast service (eMBMS), etc. Further, a system providing the URLLC service may be referred to as an URLLC system, a system providing the eMBB service may be referred to as an eMBB system, and the like. In addition, the terms "service and system" may be interchangeably used with each other.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method in the wireless communication system, for example, a long term evolution (LTE) or LTE-Advanced (LTE-A) system, the base station may transmit downlink control information (DCI) including uplink resource allocation information to a terminal on a downlink control channel (physical downlink control channel (PDCCH)) to configure at least one uplink transmission of uplink control information (e.g., a sounding reference signal (SRS), uplink control information (UCI), or a physical random access channel) and an uplink data channel (physical uplink shared channel (PUSCH)) in the terminal.

Additional aspects will be set forth in part in the description which follows and, in part, will be apparent from the description, or may be learned by practice of the presented embodiments.

For example, the terminal receiving the uplink transmission configuration information (or the uplink DCI) transmitted from the base station on the PDCCH in a subframe n performs the uplink data channel transmission (hereinafter, PUSCH transmission) according to the preset time (e.g., n+4) or the transmission time configuration information included in the uplink transmission configuration information.

In this case, if the configured uplink signal transmission is transmitted to a cell or a base station operating in an unlicensed band, the terminal may perform a channel access procedure (or listen-before talk (LBT)) on the unlicensed band in which the uplink transmission is configured before or immediately before the set uplink transmission start time, and transmit the configured uplink only if the unlicensed band is in an idle state. In this case, if it is determined that the unlicensed band is not in the idle state according to the channel access procedure performed by the terminal, the terminal cannot perform the configured uplink signal transmission. In this case, the channel access procedure in the unlicensed band in which the uplink transmission is configured may be performed by generally determining the idle state in the unlicensed band based on the comparison of strength of a signal received by the terminal for a predetermined time with a preset threshold value or a threshold value set by the base station. For example, if strength of a signal received for 25 μs is smaller than a preset threshold value of −72 dBm, the terminal may determine that the unlicensed band is in the idle state and perform the configured uplink transmission. For example, if the strength of the signal received for 25 μs is larger than the preset threshold value of −72 dBm, the terminal may determine that the unlicensed band is not in the idle state and does not perform the configured uplink transmission.

Therefore, as described above, when the uplink signal transmission is not performed at the uplink transmission start time set according to the result of performing the channel access procedure, or another uplink signal transmission is configured to be performed at the set uplink transmission start time and thus the uplink signal transmission is not performed at the preset uplink transmission start time, or a signal, which controls the uplink signal transmission not to be performed at a specific time (slot or symbol), from the base station is received and thus the uplink signal transmission is not performed at the preset uplink transmission start time, if an additional uplink transmission start time other than the set uplink transmission start time may be set and the terminal may perform the uplink signal transmission at the additionally set uplink transmission start time, the uplink performance of the terminal can be improved. In this case, however, the base station may not know when the terminal actually starts the uplink transmission.

In accordance with an aspect of the disclosure, a method for allowing a base station to set uplink signal transmission timing of a terminal and determine the transmission timing, when the terminal is configured to perform the uplink signal transmission at one or more uplink signal transmission timing.

Objects of the present disclosure are not limited to the above-mentioned objects. That is, other objects that are not mentioned may be obviously understood by those skilled in the art to which the disclosure pertains from the following description.

In accordance with an aspect of the disclosure, a method of a terminal in a wireless communication system is provide. The method includes receiving information, which is related to a first transmission time and a second transmission time of an uplink signal of a terminal, from a base station, when the uplink signal of the terminal is configured in an unlicensed band, performing a channel access in the unlicensed band, and when the unlicensed band is not in an idle state based on a channel access result before the first transmission time, performing a channel access until the second transmission time.

In accordance with an aspect of the disclosure, a method of a base station in a wireless communication system is provided. The method includes transmitting information, which is related to a first transmission time and a second transmission time of an uplink signal of a terminal, to the terminal, when the first transmission time is during an idle state and the uplink signal of the terminal is configured in an unlicensed band, receiving the uplink signal from the terminal at the first transmission time, and when the first transmission time is not during the idle state and the second transmission time is during the idle state, receiving the uplink signal from the terminal at the second transmission time.

In accordance with an aspect of the disclosure, a terminal in a wireless communication system is provided. The terminal includes a transceiver, and at least one processor configured to receive information, which is related to a first transmission time and a second transmission time of an uplink signal of the terminal, from a base station, when the uplink signal of the terminal is configured in an unlicensed band, perform a channel access in the unlicensed band, and when the unlicensed band is not in an idle state based on a channel access result before the first transmission time, perform a channel access procedure until the second transmission time.

In accordance with an aspect of the disclosure, a base station in a wireless communication system is provided. The base station includes a transceiver, and at least one processor configured to transmit information, which is related to a first transmission time and a second transmission time of an uplink signal of a terminal, to the terminal, when the first transmission time is during an idle state and the uplink signal transmission of the terminal is configured in an unlicensed band, receive the uplink signal from the terminal at the first transmission time, and when the first transmission time is not during the idle state and the second transmission time is during the idle state, receive the uplink signal from the terminal at the second transmission time.

As described above, according to the present disclosure, it is possible to effectively operate a resource by decoding the control signal in the latency reduction mode operation of the base station and the terminal and providing the transmission/reception method according to the decoded control signal.

The effects that may be achieved by the embodiments of the disclosure are not limited to the above-mentioned objects. That is, other effects that are not mentioned may be obviously understood by those skilled in the art to which the disclosure pertains from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
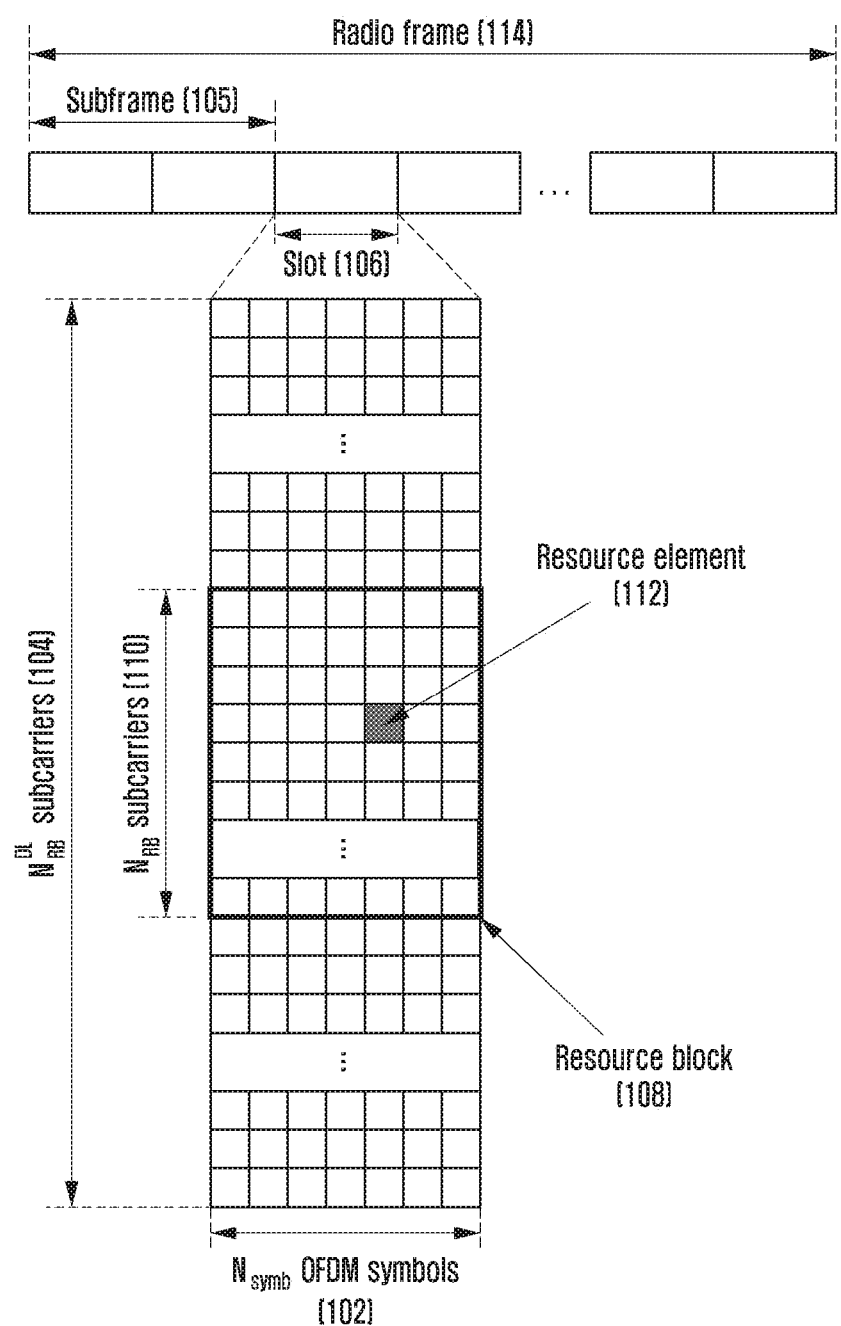
FIG. 1 is a diagram illustrating a transport structure of a downlink time-frequency domain of a long term evolution (LTE) or an LTE-advanced (LTE-A) system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a very high frequency millimeter wave (mmWave) band (e.g., 60 GHz band). To relieve a path loss of a radio wave and increase a transfer distance of the radio wave in the very high frequency band, in the 5G communication system, beamforming, massive multiple-input multiple-output (MIMO), full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid frequency shift keying (FSK) and quadrature amplitude modulation (QAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to the internet of things (IoT) network that transmits/receives information between distributed components such as things and processes the information. The internet of everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent internet technology service that creates a new value by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, technologies such as the sensor network, the M2M, and the MTC, have been implemented by techniques such as the beamforming, the MIMO, and the array antenna that are the 5G communication technologies. The application of the cloud RAN as the big data processing technology described above may also be considered as an example of the fusing of the 5G communication technology with the IoT technology.

As described above, a plurality of services can be provided to a user in the communication system, and a method capable of providing each service within the same time interval in accordance with characteristics to provide a plurality of services to users and an apparatus using the same are required.

Hereinafter, embodiments of the disclosure will be described in detail with reference to the accompanying drawings.

In describing the embodiments of the disclosure, a description of technical contents which are well known to the art to which the disclosure belongs and are not directly connected with the disclosure will be omitted. This is to more clearly transfer a gist of the disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the disclosure and methods accomplishing the same will become apparent from the following detailed description of embodiments with reference to the accompanying drawings. However, the disclosure is not limited to the embodiments disclosed herein but will be implemented in various forms. The embodiments have made disclosure of the disclosure complete and are provided so that those skilled in the art can easily understand the scope of the disclosure. Therefore, the disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed or be performed in a reverse sequence depending on corresponding functions.

Here, the term 'unit' used in the embodiment means software or hardware components such as field-programmable gate array (FPGA) and application-specific integrated circuit (ASIC) and the 'unit' performs any roles. However, the meaning of the 'unit' is not limited to software or hardware. The 'unit' may be configured to be in a storage medium that may be addressed and may also be configured to reproduce one or more processor. Accordingly, for example, the 'unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may be further separated into additional components and 'units'. In addition, the components and the 'units' may also be implemented to reproduce one or more central processing units (CPUs) within a device or a security multimedia card. Further, in an embodiment, the 'unit' may include one or more processors.

A wireless communication system has been developed from a wireless communication system providing a voice centered service in the early stage toward broadband wireless communication systems providing high-speed, high-quality packet data services, such as communication standards of high speed packet access (HSPA) and, evolved universal terrestrial radio access (E-UTRA), and LTE-advanced (LTE-A) of the third generation partnership project (3GPP), high rate packet data (HRPD) and ultra-mobile broadband (UMB) of the 3GPP2, 802.16e of IEEE or the like. In addition, the 5G or new radio (NR) communication standards are being produced as the 5G wireless communication system.

In a wireless communication system including the 5G, at least one service of enhanced mobile broadband (eMBB), massive machine type communications (mMTC), and ultra-reliable and low latency communications (URLLC) may be provided to the terminal. The services can be provided to the same terminal during the same time period. In the following embodiments, the eMBB is a high speed transmission of high capacity data, the mMTC is terminal power minimization and connection of a plurality of terminals, and the URLLC may be a service aiming at high reliability and low latency, which is not limited thereto. The above three services may be a major services in systems such as 5G/NR (new radio, next radio). In the embodiment, a coexistence method of eMBB and URLLC, a coexistence method of mMTC and URLLC, and an apparatus using the same will be described.

When the base station schedules data corresponding to the eMBB service in a specific transmission time interval (TTI) to any terminal, if the situation where the URLLC data needs to be transmitted in the TTI occurs, some of the eMBB data is not transmitted in a frequency bandwidth in which the eMBB data is already scheduled and transmitted and the URLLC data is transmitted in the frequency band. The terminal that receives the scheduled eMBB and the terminal that receives the scheduled URLLC may be the same terminal or may be different terminals. In this case, since a part where some of the eMBB data that is scheduled and transmitted in advance are not transmitted occurs, the eMBB data is highly likely to be damaged. Therefore, in the above case, it is necessary to determine a method for processing a signal received from a terminal that receives scheduling for eMBB or a terminal that receives scheduling for URLLC and a signal receiving method. Therefore, according to the embodiment, when the information according to the eMBB and the URLLC is scheduled by sharing some or the whole of the frequency band, the information according to the mMTC and the URLLC is scheduled simultaneously, the information according to the mMTC and the eMBB is scheduled simultaneously, or the information according to the eMBB, the URLLC, and the mMTC and eMBB is scheduled simultaneously, a coexistence method between heterogeneous services that can transmit the information according to each service will be described.

Hereinafter, embodiments of the disclosure will be described in detail with reference to the accompanying drawings. When it is decided that a detailed description for the known function or configuration related to the disclosure may obscure the gist of the disclosure, the detailed description therefor will be omitted. Further, the following terminologies are defined in consideration of the functions in the disclosure and may be construed in different ways by the intention or practice of users and operators. Therefore, the definitions thereof should be construed based on the contents throughout the specification. Hereinafter, a base station is the subject performing resource allocation of a terminal and may be at least one of evolved node B (eNB), a node B, a base station (BS), a wireless access unit, a base station controller, and a node on a network. The terminal may include user equipment (UE), a mobile station (MS), a cellular phone, a smart phone, a computer, or a multimedia system performing a communication function. In the disclosure, a downlink (DL) means a radio transmission path of a signal transmitted from a base station to a terminal and an uplink (UL) means a radio transmission path of a signal transmitted from the terminal to the base station. Further, as an example of LTE or an LTE-A system, an embodiment of the disclosure is described below, but the embodiment of the disclosure may be applied to other communication systems having similar technical background or a channel form. For example, 5G mobile communication technologies (5G, NR) developed could be included. Further, embodiments of the disclosure may be applied even to other communication systems by partially being changed without greatly departing from the scope of the disclosure under the decision of those skilled in the art.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The multiple access scheme as described above normally allocates and operates time-frequency resources on which data or control information is transmitted to prevent the time-frequency resources from overlapping with each other, that is, establish orthogonality, thereby dividing the data or the control information of each user.

If a decoding failure occurs upon initial transmission, the LTE system has adopted a hybrid automatic repeat request (HARQ) scheme of retransmitting the corresponding data in a physical layer. If a receiver does not accurately decode data, the HARQ scheme enables the receiver to transmit a negative acknowledgement (NACK) informing the decoding failure to a transmitter to thereby enable the transmitter to retransmit the corresponding data in the physical layer. The receiver combines the data retransmitted by the transmitter with the data that are not decoded previously, thereby increasing reception performance of the data. Further, if the receiver accurately decodes the data, an acknowledgement (ACK) notifying a decoding success is transmitted to the transmitter so that the transmitter may transmit new data.

FIG. 1 is a diagram illustrating a transport structure of a downlink time-frequency domain of an LTE system or an LTE-A system according to various embodiments of the disclosure.

Referring to FIG. 1, a horizontal axis represents a time domain and a vertical axis represents a frequency domain. A minimum transmission unit in the time domain is an OFDM symbol, in which one slot 106 is configured by collecting $N_{symb}$ OFDM symbols 102 and one subframe 105 is configured by collecting two slots. A length of the slot is 0.5 ms and a length of the subframe is 1.0 ms. Further, a radio frame 114 is a time domain interval consisting of 10 subframes. A minimum transmission unit in a frequency domain is a sub-carrier, in which the entire system transmission bandwidth consists of a total of $N_{BW}$ sub-carriers 104. However, such specific values may be applied variably.

A basic unit of resources in the time-frequency domain is a resource element (RE) 112 and may be represented by an OFDM symbol index and a subcarrier index. A resource block (RB) (or a physical resource block (PRB)) 108 is defined by the $N_{symb}$ continued OFDM symbols 102 in the time domain and $N_{RB}$ continued subcarriers 110 in the frequency domain. Thus, one RB 108 in one slot may include $N_{symb} \times N_{RB}$ REs 112. In general, the minimum frequency-domain allocation unit of data is the RB, and in the LTE system, generally $N_{symb}=7$ and $N_{RB}=12$, and the $N_{BW}$ and $N_{RB}$ can be proportional to the bandwidth of the system transmission band. A data rate is increased in proportion to the number of RBs scheduled for the terminal. The LTE system may be operated by defining six transmission bandwidths. In a frequency division duplexing (FDD) system operated by dividing the downlink and the uplink based on a frequency, a downlink transmission bandwidth and an uplink transmission bandwidth may be different from each other. A channel bandwidth represents a radio frequency (RF) bandwidth corresponding to the system transmission bandwidth. Table 1 shows a relationship between the system transmission bandwidth and the channel bandwidth that are defined in the LTE system. For example, the LTE system having the channel bandwidth of 10 MHz may be configured of a transmission bandwidth including 50 RBs.

TABLE 1

|  | Channel bandwidth $BW_{Channel}$ [MHz] | | | | | |
| --- | --- | --- | --- | --- | --- | --- |
|  | 1.4 | 3 | 5 | 10 | 15 | 20 |
| Transmission bandwidth configuration $N_{RB}$ | 6 | 15 | 25 | 50 | 75 | 100 |

The downlink control information may be transmitted within first N OFDM symbols within the subframe. In the embodiment, generally, N={1, 2, 3}. Therefore, the N value may variably apply to each subframe depending on the amount of control information to be transmitted to the current subframe. The transmitted control information may include a control channel transmission interval indicator representing over how many OFDM symbols the control information is transmitted, scheduling information on downlink data or uplink data, information on HARQ ACK/NACK, or the like.

In the LTE system, the scheduling information on the downlink data or the uplink data is transmitted from a base station to a terminal through downlink control information (DCI). The DCI is defined depending on various formats. Depending on each format, it may be represented whether the DCI is scheduling information (on the uplink data (UL grant) or scheduling information (on the downlink data (DL grant), whether the DCI is compact having a small-sized control information, whether to apply spatial multiplexing using a multiple antenna, whether the DCI is for a power control, or the like. For example, DCI format 1 that is the scheduling control information (DL grant) on the downlink data may include at least one of the following control information.

Resource allocation type 0/1 flag: It is indicated whether a resource allocation scheme is type 0 or type 1. The type 0 applies a bitmap scheme to allocate a resource in a resource block group (RBG) unit. In the LTE system, a basic unit of the scheduling is the resource block (RB) represented by a time-frequency domain resource and the RBG consists of a plurality of RBs and thus becomes a basic unit of the scheduling in the type 0 scheme. The type 1 allocates a specific RB within the RBG.

Resource block assignment: The RB allocated to the data transmission is indicated. The represented resource is determined depending on the system bandwidth and the resource allocation scheme.

Modulation and coding scheme (MCS): The modulation scheme used for the data transmission and a size of a transport block that is data to be transmitted are indicated.

HARQ process number: An HARQ process number is indicated.

New data indicator: An HARQ initial transmission or retransmission is indicated.

Redundancy version: An HARQ redundancy version is indicated.

Transmit power control (TPC) command for physical uplink control channel (PUCCH): A transmit power control command for the PUCCH that is an uplink control channel is indicated.

The DCI is subjected to a channel coding and modulation process and then may be transmitted on a physical downlink control channel (PDCCH) (or control information, which is interchangeably used below) or an enhanced PDCCH (EPDCCH) (or enhanced control information, which is interchangeably used below).

Generally, the DCI is independently scrambled with a specific radio network temporary identifier (RNTI) (or a terminal identifier) for each terminal to be added with a cyclic redundant check (CRC), subjected to channel coding, and then configured of independent PDCCH to be transmitted. In the time domain, the PDCCH is transmitted while being mapped during the control channel transmission interval. A mapping location in the frequency domain of the PDCCH may be determined by identifiers (IDs) of each terminal and transmitted over the entire system transmission bandwidth.

The downlink data may be transmitted on a physical downlink shared channel (PDSCH) that is a physical channel for downlink data transmission. The PDSCH may be transmitted after the control channel transmission interval, and the scheduling information on the specific mapping location in the frequency domain, the modulation scheme, or the like may be determined based on the DCI transmitted on the PDCCH.

By the MCS among the control information configuring the DCI, the base station notifies the modulation scheme applied to the PDSCH to be transmitted to the terminal and a data size (transport block size (TBS)) to be transmitted. In the embodiments, the MCS may consist of 5 bits or bits larger or smaller than that. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (16 QAM), and 64QAM, in which each modulation order $Q_m$ corresponds to 2, 4, and 6. That is, in the case of the QPSK modulation, 2 bits per symbol may be transmitted, in the case of the 16QAM modulation, 4 bits per symbol may be transmitted, and in the case of the 64QAM modulation, 6 bits per symbol may be transmitted. Further, the modulation scheme above 256 QAM may be used depending on the system modification.

Figure 2:
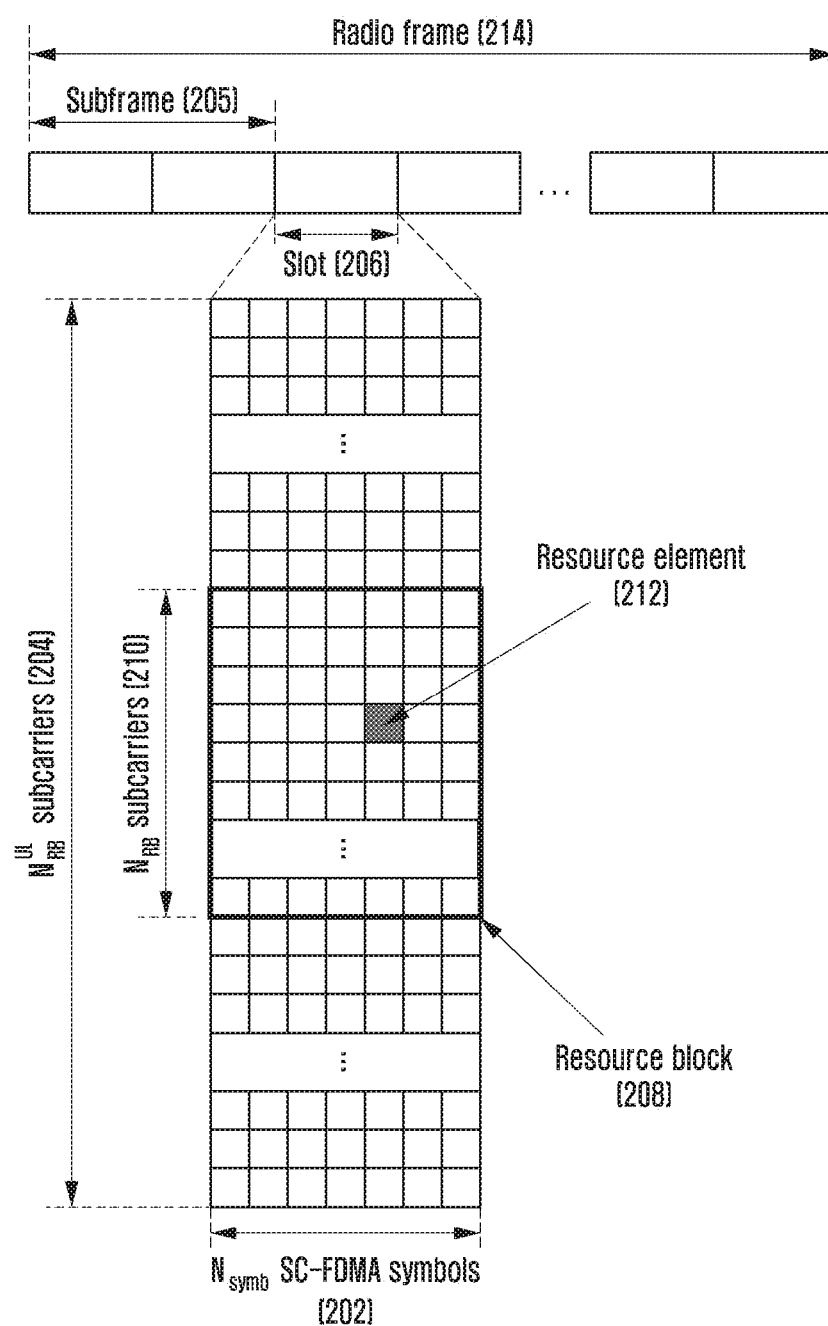
FIG. 2 is a diagram illustrating a transport structure of an uplink time-frequency domain of an LTE and an LTE-A system according to various embodiments of the disclosure.

FIG. 2 is a diagram illustrating a transport structure of an uplink time-frequency domain of an LTE and an LTE-A system according to various embodiments of the disclosure.

Referring to FIG. 2, an abscissa represents a time domain and an ordinate represents a frequency domain. The minimum transmission unit in the time domain is an SC-FDMA symbol 202, and the $N_{symb}^{UL}$ SC-FDMA symbols are gathered to form one slot 206. Two slots are collected to configure one subframe 205. The minimum transmission unit in the frequency domain is a subcarrier, in which the entire system transmission bandwidth 204 includes a total of $N_{BW}$ subcarriers. The $N_{BW}$ may have a value proportional to the system transmission bandwidth.

A basic unit of resources in the time-frequency domain is a resource element (RE) 212 and may be defined by an SC-FDMA symbol index and a subcarrier index. A resource block pair (RB pair) 208 may be defined by $N_{symb}^{UL}$ continued SC-FDMA symbols in the time domain and $N_{SC}^{RB}$ continued subcarriers in the frequency domain. Accordingly, one RB consists of $N_{symb}^{UL} \times N_{SC}^{RB}$ REs. In general, the minimum transmission unit of the data or the control information is the RB unit. The PUCCH is mapped to a frequency domain corresponding to 1 RB and transmitted for one subframe.

In the LTE system, a timing relationship between a PUCCH or a physical uplink shared channel (PUSCH) is defined, with the PUCCH or the PUSCH being an uplink physical channel to which an HARQ ACK/NACK corresponding to a PDSCH as a physical channel for downlink data transmission or a PDCCH/EPDDCH) including a semi-persistent scheduling (SPS) release is transmitted. For example, in an LTE system operated by FDD, the HARQ ACK/NACK corresponding to the PDSCH transmitted in an n–4-th subframe or the PDCCH/EPDCCH including the SPS release may be transmitted to the PUCCH or the PUSCH in an n-th subframe.

In the LTE system, the downlink HARQ has adopted an asynchronous HARQ scheme in which data retransmission time is not fixed. That is, if for initial transmission data transmitted by the base station, the HARQ NACK is fed back from the terminal, the base station freely determines transmission time of retransmission data based on the scheduling operation. The terminal performs buffering on data determined as an error as a result of decoding the received data for an HARQ operation and then performs combining with the next retransmission data.

The HARQ ACK/NACK information of the PDSCH transmitted in subframe n-k is transmitted from the terminal to the base station on the PUCCH or the PUSCH in the subframe n. In this case, the k may be defined differently according to the FDD or time division duplex (TDD) of the LTE system and the subframe configuration thereof. For example, in the case of the FDD LTE system, the k is fixed as 4. Meanwhile, in the case of the TDD LTE system, the k may be changed according to the subframe setting and the subframe number. In addition, the value of k may be differently applied depending on the TDD configuration of each carrier at the time of data transmission through a plurality of carriers. In the case of the TDD, k is determined according to the TDD UL/DL configuration as shown in Table 2 below.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 3

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 |  |  |  | 4 | 6 |  |  |  |
| 1 |  | 6 |  |  | 4 |  | 6 |  |  | 4 |
| 2 |  |  |  | 4 |  |  |  |  | 4 |  |
| 3 | 4 |  |  |  |  |  |  |  | 4 | 4 |
| 4 |  |  |  |  |  |  |  |  | 4 | 4 |
| 5 |  |  |  |  |  |  |  |  | 4 |  |
| 6 | 7 | 7 |  |  |  | 7 | 7 |  |  | 5 |

Meanwhile, the HARQ ACK information of the PHICH transmitted in subframe i is related to the PUSCH transmitted in subframe i-k. In the case of the FDD system, the k is given as 4. That is, in the FDD system, the HARQ ACK information of the PHICH transmitted in the subframe i is related to the PUSCH transmitted in the subframe i-4. In the case of the TDD system, when the terminal in which enhanced interference mitigation and traffic adaptation (EIMTA) is not configured has only one serving cell or all the same TDD UL/DL configurations, a k value may be given according to the following [Table 4] in case of 6 in the TDD UL/DL configuration 1.

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 |  |  |  | 7 | 4 |  |  |  |
| 1 |  | 4 |  |  | 6 |  | 4 |  |  | 6 |
| 2 |  |  |  | 6 |  |  |  |  | 6 |  |
| 3 | 6 |  |  |  |  |  |  |  | 6 | 6 |
| 4 |  |  |  |  |  |  |  |  | 6 | 6 |
| 5 |  |  |  |  |  |  |  |  | 6 |  |
| 6 | 6 | 4 |  |  |  | 7 | 4 |  |  | 6 |

That is, for example, in the TDD UL/DL configuration 1, the PHICH transmitted in the subframe 6 may be the HARQ ACK information of the PUSCH transmitted in subframe 2 before subframe 4.

When the TDD UL/DL configuration is 0, if the HARQ ACK is received as the PHICH resource corresponding to $I_{PHICH}=0$, the PUSCH that the HARQ ACK information indicates is transmitted in the subframe i-k, wherein k is determined according to the above Table 4. If the HARQ ACK is received as the PHICH resource corresponding to $I_{PHICH}=1$ when the TDD UL/DL configuration is 0, the PUSCH that the HARQ ACK information indicates is transmitted in subframe i-6.

In the LTE system, unlike the downlink HARQ, the uplink HARQ has adopted a synchronous HARQ scheme in which the data transmission time is fixed. That is, an uplink/downlink timing relationship of the PUSCH that is the physical channel for uplink data transmission, the PDCCH that is the downlink control channel preceding the PUSCH, and a physical hybrid indicator channel (PHICH) that is a physical channel to which the downlink HARQ ACK/NACK corresponding to the PUSCH is transmitted may be transmitted/received depending on the following rules.

If in the subframe n, the terminal receives the PDCCH including the uplink scheduling control information transmitted from the base station or the PHICH to which the downlink HARQ ACK/NACK are transmitted, the terminal transmits the uplink data corresponding to the control information on the PUSCH in subframe n+k. In this case, the k is differently defined depending on the FDD or TDD of the LTE system and the configuration thereof. For example, in the case of the FDD LTE system, k may be fixed as 4. Meanwhile, in the case of the TDD LTE system, k may be changed according to the subframe setting and the subframe number. In addition, the value of k may be differently applied depending on the TDD configuration of each carrier at the time of data transmission through a plurality of carriers. In the case of the TDD, k is determined according to the TDD UL/DL configuration as shown in Table 3 below.

In the case of the LTE system that performs the downlink or uplink communications in an unlicensed band (e.g., a licensed-assisted access system (LAA)), the base station or the terminal should determine an idle state of the unlicensed band performing the communications prior to transmitting the downlink or uplink signal. For example, only when the magnitude of the signal received in the unlicensed band for a predetermined time is smaller than a specific threshold, the base station or the terminal may perform the signal transmission in the unlicensed band. Therefore, in the case of transmitting the uplink signal in the LAA system, the base station determines the idle state of the unlicensed band, and if it is determined that the unlicensed band is in the idle state, the base station may transmit the PDCCH including the uplink scheduling control information for establishing the uplink data transmission of the terminal.

The description of the wireless communication system is based on the LTE system, and the contents of the disclosure are not limited to the LTE system but may be applied to various wireless communication systems such as NR and 5G. Also, in the embodiment, in a case where the disclosure is applied to another wireless communication system, k may be changed and applied to a system using a modulation scheme corresponding to FDD.

Figure 3:
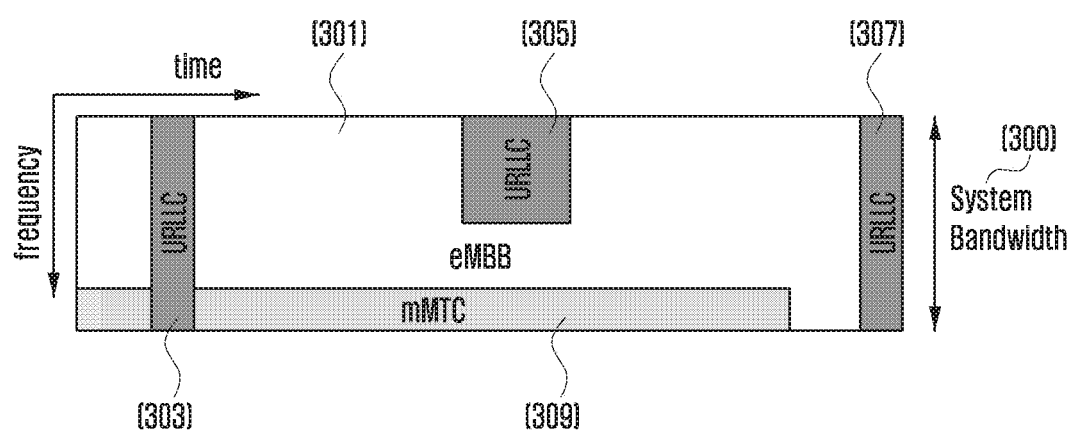
FIG. 3 is a diagram illustrating a state in which data for enhanced mobile broadband (eMBB), ultra-reliable and low latency communication (URLLC), and massive machine type communication (mMTC) are allocated in frequency-time resources in a communication system according to various embodiments of the disclosure.
Figure 4:
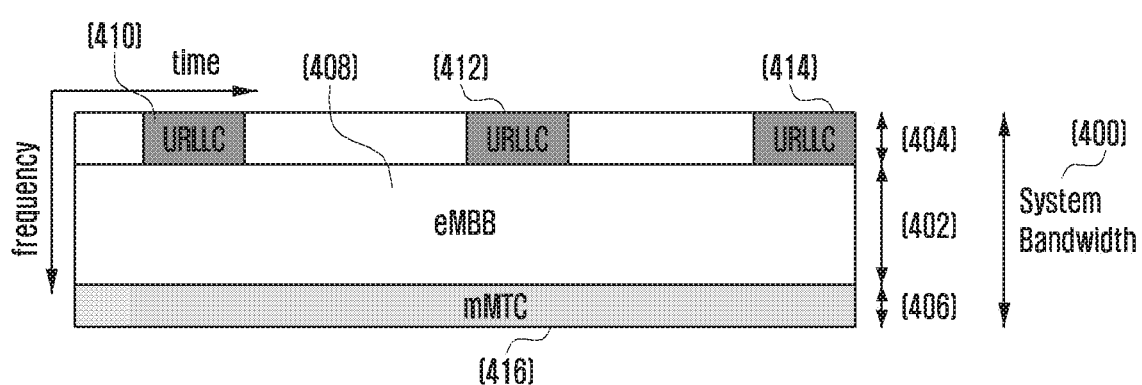
FIG. 4 is a diagram illustrating a state in which data for eMBB, URLLC, and mMTC are allocated by frequency-time resources in a communication system according to various embodiments of the disclosure.

FIG. 3 is a diagram illustrating a state in which data for eMBB, URLLC, and mMTC are allocated in frequency-time resources in a communication system according to various embodiments of the disclosure. FIG. 4 is a diagram illustrating a state in which data for eMBB, URLLC, and mMTC are allocated by frequency-time resources in a communication system according to various embodiments of the disclosure.

Referring to FIGS. 3 and 4, methods are illustrated for allocating frequency and time resources for information transmission in each system.

Referring to FIG. 3 a state is illustrated in which data for the eMBB, the URLLC, and the mMTC are allocated in the entire system frequency bandwidth 300. If URLLC data 303, 305, and 307 need to be generated and transmitted while the eMBB 301 and the mMTC 309 are allocated and transmitted in a specific frequency band, the transmitter may empty or does not transmit a part to which the eMBB 301 and the mMTC 309 are allocated in advance is emptied and may transmit the URLLC data 303, 305, and 307. In the URLLC among the above services, since there is a need to reduce the delay time, the URLLC data 303, 305, and 307 may be allocated and transmitted while being allocated to a part of the resource to which the eMBB 301 is allocated. Of course, if the URLLC is transmitted by being additionally allocated to the resource to which the eMBB is allocated, the eMBB data may not be transmitted in the redundancy frequency-time resources, such that the transmission performance of the eMBB data may deteriorate. That is, in such a case, the eMBB data transmission failure may occur due to the URLLC allocation.

Referring to FIG. 4, an entire system frequency band 400 may be segmented and thus services and data are transmitted in each subband 402, 404, and 406. Information related to the subband setting may be determined in advance. The information may be transmitted from the base station to the terminal by higher signaling. Alternatively, the information related to the subbands may be arbitrarily divided by the base station or a network node to transmit services without transmitting separate subband configuration information to the terminal. FIG. 4 illustrates an example in which the subband 402 is used for transmission of eMBB data 408, the subband 404 is used for transmission of URLLC data 410, 412, and 414, and the subband 406 is used for transmission of mMTC data 416.

According to the embodiment, a TTI length used for the URLLC transmission may be shorter than that used for the eMBB or mMTC transmission. In addition, a response to the information related to the URLLC may be transmitted faster than the eMBB or mMTC, such that the information may be transmitted and received with the low latency.

Figure 5:
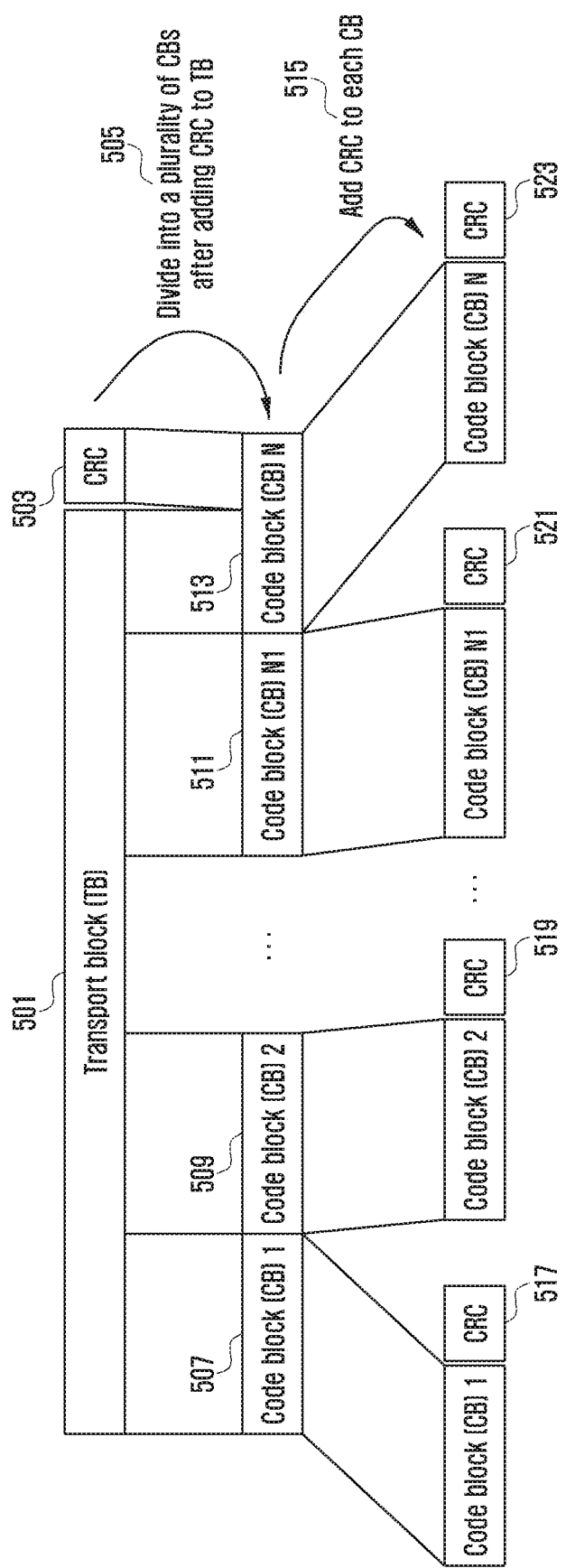
FIG. 5 is a diagram illustrating a structure in which one transport block is divided into several code blocks and a cyclic redundant check (CRC) is added according to various embodiments of the disclosure.

FIG. 5 is a diagram illustrating a process in which one transport block is divided into several code blocks and a CRC is added according to various embodiments of the disclosure.

Referring to FIG. 5, a CRC 503 may be added to the last or first part of one transport block (TB) 501 to be transmitted in the uplink or the downlink. The CRC may have 16 bits or 24 bits, the predetermined number of bits, or the number of bits varying depending on a channel condition or the like, and may be used to determine whether channel coding succeeds. As illustrated at reference numeral 505, the blocks to which the TB 501 and the CRC 503 are added may be divided into several codeblocks (CBs) 507, 509, 511, and 513. The maximum size of the code block is predefined and the code block may be divided accordingly. In this case, the last code block 1 may be smaller than other code blocks, or the last code block 513 may be added with 0, a random value, or 1 so that the length thereof may be adjusted to be equal to the length of other code blocks. As illustrated at reference numeral 515, CRCs 517, 519, 521, and 523 may be added to the divided code blocks, respectively. The CRC may have 16 bits or 24 bits or the predetermined number of bits, and may be used to determine whether channel coding succeeds. However, the CRC 503 added to the TB and the CRCs 517, 519, 521, and 523 added to the code block may be omitted depending on a type of channel codes to be applied to the code block. For example, if a low density parity check (LDPC) code is applied to the code block instead of a turbo code, the CRCs 517, 519, 521, and 523 to be inserted into each code block may be omitted. However, even when the LDPC is applied, the CRCs 517, 519, 521, and 523 may be added to the code block as they are. In addition, the CRC may be added or omitted even when a polar code is used.

As will be described below, the eMBB service is referred to as a first type service, and the data for eMBB is referred to as first type data. The first type service or the first type data is not limited to the eMBB, but may correspond to even a case in which a high speed data transmission is required or a broadband transmission is performed. Further, the URLLC service is referred to as a second type service, and the data for URLLC is referred to as second type data. The second type service or the second type data are not limited to the URLLC, but may correspond to even another system in which the low latency is required or the high reliability transmission is required or a case in which the low latency and the reliability are required simultaneously. Further, the mMTC service is referred to as a third type service and the data for mMTC is referred to as third type data. The third type service or the third type data are not limited to the mMTC but may correspond to a case in which low speed, wide coverage, low power or the like are required. In addition, it may also be understood that the first type service may or may not include the third type service when describing the embodiment.

To transmit the above three services or data, a structure of physical layer channels used for each type may be different. For example, at least one of the TTI length, the frequency resource allocation unit, the control channel structure, the method for mapping data may be different.

Although three services and three data have been described above, more types of services and the corresponding data may exist. Even in this case, the content of the disclosure may be applied.

For describing the method and the apparatus proposed in the disclosure, the terms physical channel and signal in the existing LTE or LTE-A system can be used. However, the content of the disclosure may be applied to wireless communication systems other than LTE and LTE-A systems.

As described above, the embodiment defines transmission and reception operations of the terminal and the base station for the transmission of the first type service, the second type service, the third type service, or the data and receiving operation of a terminal and a base station for data transmission, and proposes a method for operating terminals receiving different types of services or data scheduling within the same system together. In the disclosure, a first type terminal, a second type terminal, and a third type terminal each indicate terminals that receive the first type service, the second type service, the third type service, or the data scheduling. In the embodiment, the first type terminal, the second type terminal, and the third type terminal may be the same terminal or may be different terminals.

In the following embodiment, at least one of the PHICH, an uplink scheduling grant signal, and a downlink data signal is referred to as a first signal. In addition, in the disclosure, at least one of the uplink data signal for uplink scheduling grant and the HARQ ACK/NACK for the downlink data signal are referred to as a second signal. That is, in the embodiment, among the signals transmitted from the base station to the terminal, a signal expecting a response from terminal may be the first signal, and a response signal of the terminal corresponding to the first signal may be the second signal. Also, in the embodiment, the service type of the first signal may be at least one of eMBB, URLLC, and mMTC, and the second signal may also correspond to at least one of the services. For example, in the LTE and LTE-A systems, the PUCCH formats 0, 0A, and 0B or 4, 4A, and 4B and PHICH may be the first signal, and the second signal corresponding thereto may be the PUSCH. In addition, for example, in the LTE and LTE-A systems, the PDSCH may be the first signal, and the PUCCH or PUSCH including the HARQ ACK/NACK information of the PDSCH may be the second signal. Also, the PDCCHEPDCCH including an aperiodic channel state information (CSI) trigger may be the first signal, and the second signal corresponding thereto may be the PUSCH including channel measurement information.

In addition, in the following embodiment, if it is assumed that the base station transmits the first signal in an n-th TTI and the terminal transmits the second signal in an n+k-th TTI, notifying the transmission timing of the second signal to the terminal by the base station is the same as notifying a k value. In this case, k may be set through one or more components. For example, k may be set as k=b+a through b and a. In this case, the value b may be previously defined depending on processing capability of the terminal or capability of the terminal, a frame structure type (frame structure type 1—FDD, frame structure type 2—TDD, and frame structure type 3—LAA) or the like or may be set by the higher signal from the base station. For example, in the FDD LTE system, the value b for the terminal in the normal mode may preset to be 4, and the value b for the terminal in the latency reduction mode may preset to be a value smaller than the b value of the terminal in the normal mode, for example, b=3, or receive the setting of the value b from the base station. It is assumed that the terminal transmits the second signal in an n+b+a-th TTI when the base station transmits the first signal in an n-th TTI, and if the value b is preset, notifying the transmission timing of the second signal from the base station to the terminal is the same as informing an offset value a. In this case, the normal mode and the latency reduction mode are described below in more detail.

The contents of the disclosure are described based on the FDD LTE system, but can also be applied to the TDD system, the LAA system, the NR system and the like.

Hereinafter, in the disclosure, the higher signaling is a method for transmitting a signal from a base station to a terminal using a downlink data channel of a physical layer or from a terminal to a base station using an uplink data channel of a physical layer, and may also be referred to as radio resource control (RRC) signaling, packet data convergence protocol (PDCP) signaling, or a media access control (MAC) control element (CE).

The disclosure describes a method for determining a transmission timing of a second signal after a terminal or a base station receives a first signal, but the method for transmitting a second signal may be various. For example, after the terminal receives the PDSCH, which is downlink data, the transmission timing of the HARQ ACK/NACK information corresponding to the PDSCH to the base station follows the method described in the disclosure. However, a method for selecting a PUCCH format to be used, a method for selecting a PUCCH resource, a method for mapping HARQ ACK/NACK information to a PUSCH or the like may follow the conventional LTE system.

In general, the uplink transmission of the terminal is scheduled or configured from the base station. For example, the terminal receiving the first signal (uplink grant transmitted on the PDCCH) at time n (or slot n) performs the configured second signal transmission, that is, the uplink transmission according to the first signal at a preset time k from a first signal reception time. Here, k may be predefined between the base station and the terminal based on a symbol or a slot, or the terminal may receive the setting by the higher signal from the base station. In this case, k may be transmitted to the terminal while being included in the first signal transmitted by the base station. Also, k may be predefined as different values depending on a subcarrier spacing used in the cell, the terminal may receive the setting by the higher signal from the base station, or may be set by the first signal. In this case, the terminal may match at least one value of the second signal transmission time, the transmission start time (symbol or slot), the transmission end time (symbol or slot), and the transmission interval length with the preset value, may receive the setting by the higher signal from the base station, or follow the value transmitted through the first signal. For example, the terminal is configured to transmit a second signal at time n+k via a first signal at time n. In this case, the first signal may include a value corresponding to the second signal transmission start symbol, the transmission end symbol, and the transmission interval length (symbol or slot).

Figure 6:
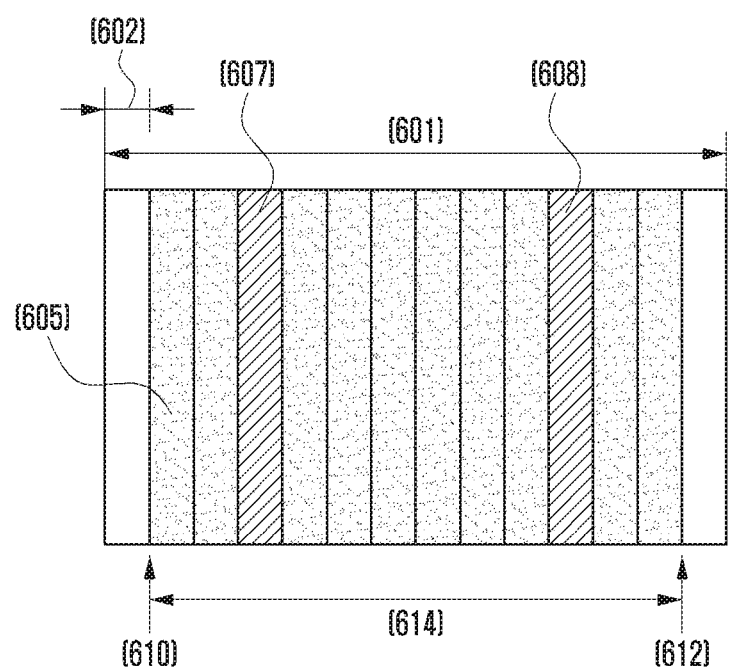
FIG. 6 is a diagram illustrating a method for uplink transmission by a terminal according to various embodiments of the disclosure.

FIG. 6 is a diagram illustrating a method for uplink transmission by a terminal according to various embodiments of the disclosure.

Referring to FIG. 6, the terminal receives the setting of the second signal transmission at slot n+k 601 by the first signal at slot n. The slot 601 includes symbols each having a symbol interval 602. In this case, the first signal received by the terminal at the slot n includes the values of the second signal transmission start symbol 610 and the transmission end symbol 612. In this case, the first signal may not include the transmission duration length 614. In addition, the units of the transmission start time, the transmission end time, and the transmission interval length may be one or more symbols or slots, and the units of the transmission start time, transmission end time, and transmission interval length may be set differently. For example, the transmission start time and the transmission end time may be set in units of one symbol or one or more symbol, and the transmission interval length may be set in units of one slot or one or more slot. In this case, a demodulation reference signal (DMRS) for decoding the second signal may be transmitted for decoding the second signal in at least one of symbols 607 and 608 of FIG. 6, and the second signal may be transmitted through a resource 605 other than a frequency and time in which the DMRS is transmitted and may uplink data, an uplink control signal, and the like.

If the second uplink signal transmission is configured to be transmitted to a cell or a base station operating in an unlicensed band, the terminal may perform a channel access procedure on the unlicensed band in which the uplink transmission is configured before or immediately before the set second signal transmission start time, and transmit the configured uplink signal only if the unlicensed band is in an idle state.

In this case, if it is determined that the unlicensed band is not in the idle state according to the channel access procedure performed by the terminal, the terminal cannot perform the configured uplink signal transmission.

In other words, in FIG. 6, the terminal performs the channel access procedure on the unlicensed band in which the second signal transmission is configured before the symbol 610, which is set as the second signal transmission start time. If it is determined that the unlicensed band is in the idle state based on the channel access procedure performed by the terminal immediately before the start of the second signal transmission, the terminal performs the configured second signal transmission using symbols from the symbol 610, set as the second signal transmission start time, to the symbol 612, set as the second signal transmission end time. If it is determined that the unlicensed band is not in the idle state based on the channel access procedure performed by the terminal immediately before the start of the second signal transmission, the uplink performance of the terminal may be lowered since the terminal does not perform the entire second signal transmission.

Accordingly, one or more uplink signal transmission start time may be set for the second signal, and the channel access procedure of the terminal may be additionally performed, thereby enhancing the uplink performance of the terminal. In other words, in a terminal capable of transmitting an uplink signal at one or more uplink signal transmission start time and a base station capable of receiving the transmitted uplink signal, the base station may set one or more time or symbol which can start transmitting the uplink signal to the terminal through the higher signal within a slot or a subframe.

For example, the base station may be configured so that the terminal can start transmitting the uplink signal in one or more symbol (e.g., 0, 1, 3, or symbols 0, 1, 3, 7 or the like in a subframe) in which the uplink signal is transmitted to the terminal through the higher signal within a slot or a subframe. In this case, the base station can be configured so that the terminal can start transmitting the uplink signal in a slot or all symbols in the subframe.

Figure 7A:
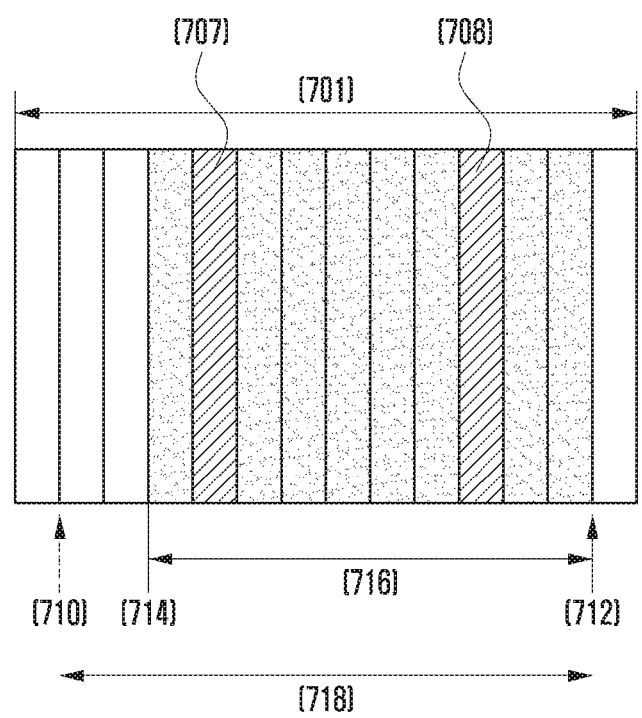
FIGS. 7A, and 7B are diagrams illustrating additional methods for uplink transmission by a terminal according to various embodiments of the disclosure.
Figure 7B:
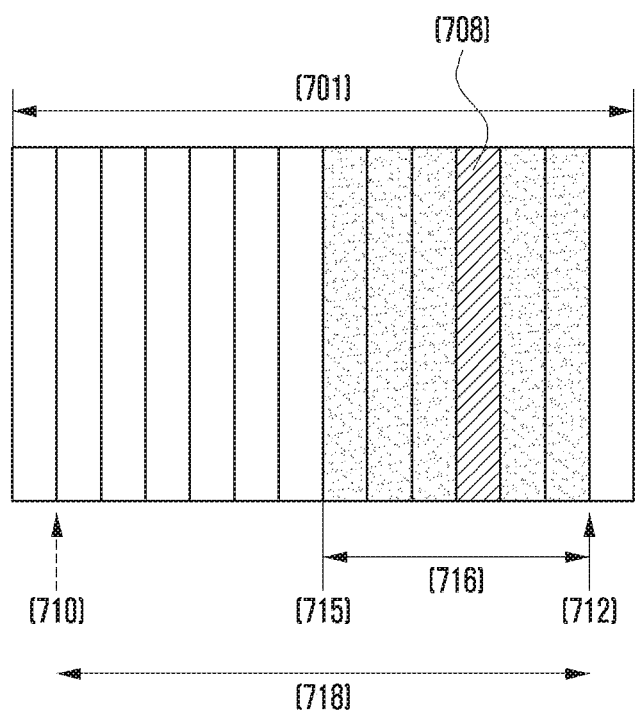

FIGS. 7A and 7B are diagrams illustrating additional methods for uplink transmission by a terminal according to various embodiments of the disclosure.

Referring to FIG. 7A, the terminal receives the first signal at time n or slot n, and performs the channel access procedure on the unlicensed band, in which the second signal transmission is configured, before a symbol 710, which is set as the second signal transmission start time, at time n+k or slot n+k 701 depending on the received first signal. If it is determined that the unlicensed band is in the idle state based on the channel access procedure performed by the terminal immediately before the start of the second signal transmission, the terminal performs the configured second signal transmission using symbols (or transmission time interval 716) from the symbol 710, set as the second signal transmission start time, to the symbol 712, set as the second signal transmission end time. If it is determined that the unlicensed band is not in the idle state based on the channel access procedure performed by the terminal immediately before the start of the second signal transmission, the terminal performs the channel access procedure until an additionally set symbol 714. In this case, the terminal can additionally perform the channel access procedure immediately before the symbol 714 additionally set as the second signal transmission start time according to the channel access procedure.

If it is determined that the unlicensed band is in the idle state based on the channel access procedure performed by the terminal before the additionally set second signal transmission start time 714, the terminal may perform the configured second signal transmission using symbols from the symbol 710, set as the second signal transmission start time, to the symbol 712, set as the second signal transmission end time.

In this case, if the first signal includes the transmission start time 714 and a transmission time interval 718 without the value for the transmission end time 712, the terminal may transmit the second signal from the transmission start time 710 or 714 from the transmission time interval 718. In this case, if the first signal includes the transmission end time 712 value, the terminal can transmit the second signal from the transmission start time 710 or 714 to the transmission end time 712. That is, in this case, the transmission time interval 718 may decrease or change according to the actual second signal transmission start time (716).

If the terminal receives the first signal for configuring the second signal transmission at the slot n and slot n+k as described above, the terminal generates the second signal transmitted at the slot n+k according to the transmission time interval 718 of the second signal configured through the first signal. In other words, the terminal generates the second signal, which is transmitted during the time set by the first signal, at least before the slot n+k, without considering the additional transmission start time.

In this case, although the terminal fails to transmit the second signal in the second signal transmission start symbol 710, which is set in the first signal according to the channel access procedure or the like, when the transmission of the second signal may be performed in transmission start symbol 714 additionally set, the transmission time interval of the second signal is different, so the previously generated second signal cannot be transmitted as it is. In this case, the terminal may regenerate the second signal according to the newly determined transmission time interval 716, or puncture and transmit some of the second signals, which are previously generated according to the transmission time interval 718, according to the transmission time interval 716 and transmit the second signal. For example, the terminal may puncture the second signal before the additional transmission start symbol 714.

Therefore, as described above, when the uplink signal transmission is not performed at the uplink transmission start time set according to the result of performing the channel access procedure, or another uplink signal transmission is configured to be performed at the set uplink transmission start time and thus the uplink signal transmission is not performed at the preset uplink transmission start time, or a signal, which controls the uplink signal transmission not to be performed at a specific time (slot or symbol), from the base station is received and thus the uplink signal transmission is not performed at the preset uplink transmission start time, if an additional uplink transmission start time other than the set uplink transmission start time may be set and the uplink signal transmission may be performed at the additionally set uplink transmission start time, the uplink performance of the terminal can be improved. In this case, however, the base station may not know when the terminal actually starts the uplink transmission.

The disclosure proposes a method for allowing a terminal to set uplink signal transmission time and a base station to determine the transmission time, when the terminal is configured to perform the uplink signal transmission at one or more uplink signal transmission time in a predetermined interval (e.g., slot or subframe).

In this case, a point in time or symbol that can start or perform the transmission of one or more uplink signal in a predetermined interval set by the terminal may consist of all symbols within the predetermined interval, or specific symbols which are predefined within the predetermined interval or set by the higher signal from the base station. In this case, the specific symbols may be within the predetermined interval.

Method 1: Determine uplink signal transmission start time based on received DMRS transmission symbol.

Method 1 is a method of informing a base station of transmission start time or symbol of a second signal by allowing a terminal to transmit a DMRS signal for decoding of the second signal at another location according to the transmission start time or symbol of the second signal. Method 1 will be described in more detail as follows. The terminal receives the first signal configuring the second signal transmission at the slot n and determines the second signal transmission time (e.g., slot n+k) by the received first signal. In addition, the terminal may receive the setting of at least one of the transmission start symbol, the transmission end symbol, and the transmission interval length in the second signal transmission slot n+k by the received first signal. In other words, the first signal includes a field indicating at least one of the transmission start symbol, the transmission end symbol, and the transmission interval length.

If the uplink transmission is an uplink transmitted to the cell operating in the unlicensed band, the terminal should perform the channel access procedure on the unlicensed band before the set second signal transmission start symbol. If it is determined that the unlicensed band is not in the idle state, when the terminal may receive the setting of at least one second signal transmittable start time, the terminal sequentially resume or again perform the channel access procedure on the second signal transmission start time set in the first signal, and transmit the second signal depending on whether the unlicensed band is in the idle state. In this case, if the unlicensed band determined based on the channel access procedure before the second signal transmission start time or the additional second signal transmission possible start timing set by the first signal is in the idle state, the terminal may transmit the second signal from the time when the unlicensed band is determined to be in the idle state or the transmission possible time corresponding thereto. In this case, the DMRS transmitted by the terminal for decoding the second signal in the base station may be transmitted in symbols after symbol K from the second signal transmission start symbol. In this case, K=0 may be included, and K may be defined in advance between the base station and the terminal, or the terminal may receive the setting by the higher signal from the base station.

In order to receive the second signal, the base station may allow the terminal to detect the DMRS transmitted after the K symbol from the second signal transmission start symbol set by the first signal and the additionally set transmission start possible symbol, and may confirm whether to transmit the second signal of the terminal, estimate a channel for decoding the second signal, and determine the second signal transmission start symbol of the terminal, based on the DMRS.

The second signal transmission start symbol and the DMRS transmission symbol for the case of K=1 will be described with reference to FIG. 7A.

In FIG. 7A, the terminal may be configured to receive the first signal at the time n or the slot n and start to transmit the second signal at the time n+k or in the symbol 710 of the slot n+k 701 according to the received first signal. In this case, the terminal performs the channel access procedure on the unlicensed band in which the second signal transmission is configured before the second signal transmission start symbol. If it is determined that the unlicensed band is in the idle state based on the channel access procedure performed by the terminal immediately before the start of the second signal transmission, the terminal performs the configured second signal transmission in the symbols (or transmission time interval 718) from the set second signal transmission start symbol 710 to the symbol 712 set as the second signal transmission end time. If it is determined that the unlicensed band is not in the idle state by the channel access procedure performed before the second signal transmission start time 710 set by the terminal based on the first signal, when it is determined that the terminal is configured to transmit the second signal from the base station at one or more transmission start time, the terminal may resume the channel access procedure which is being already performed until the time additionally set as the second signal transmission start time or before the symbol 714 or again perform a new channel access procedure. In this case, it is also possible to resume or newly perform the channel access procedure immediately before the symbol 714 additionally set as the second signal transmission start time according to the channel access procedure. If it is determined that the unlicensed band is in the idle state by the channel access procedure performed by the terminal before the additionally set second signal transmission start time 714, the terminal may transmit the second signal from the second signal transmission start time 714. In this case, if K=1, the terminal transmits the DMRS 707 in symbol K=1 immediately following the second signal transmission possible symbol. Another DMRS 708 may also be transmitted. The base station may allow the terminal to use at least one information of the second signal transmission start symbol set by the first signal at the time n+k or the slot n+k, the additionally set transmission start symbol, K, and the like, so the terminal may determine the transmittable DMRS location and detect the DMRS at the determined location. In this case, the base station may perform at least one of the determination on whether to transmit the second signal of the terminal, the channel estimation for decoding the second signal, the determination on the second signal transmission start symbol, or the like based on the DMRS detection. In other words, the base station may allow the terminal to detect the DMRS for the DMRS location that the terminal can transmit based on the set second signal transmission possible time and K, and may determine a location at which the terminal starts to actually transmit the second signal based on the detected DMRS location and K.

Referring to FIG. 7B, another example is illustrated where, for example, K=3. If the terminal determines that the unlicensed band is not in the idle state at the second signal transmission start time 710 set by the first signal and the additionally set second signal transmission start time 714, the terminal may perform the channel access procedure on the unlicensed band before the additionally set second signal transmission start time 715, and may transmit or may not transmit the set second signal depending on the determined channel state.

In this case, the terminal may not be able to transmit one or more DMRS symbol at one slot or a TTI of the configured DMRSs depending on the transmission start symbol of the second signal. Also, K may be set to be one or more values, and K may be set differently according to the transmission start symbol location of the second signal. For example, K may be set to be 1 when the transmission start symbol of the second signal is 3, and K may be set to be 3 when the transmission start symbol of the second signal is 7. In addition, K can be applied only when the second signal is transmitted at the additionally set second signal transmission start time. For example, the second signal transmitted at the second signal transmission start time is transmitted at a fixed position as shown in FIG. 6, and the additionally set second signal transmission start time, for example, K=1 when the transmission start symbol of the second signal is 3, K=3, and the transmission start symbol of the second signal is 7, as shown in FIGS. 7A and 7B. Also, K may be set differently according to the second signal transmission start time value set by the first signal.

Although method 1 has been described on the assumption that the uplink signal transmission start time is determined based on the DMRS transmission symbol, other signals (for example, an initial signal) other than the DMRS, such as a synchronization signal, a random-access channel (RACH), and a signal having a new preamble type are transmitted in the first symbol among the uplink transmittable symbols, so that the base station may determine the uplink signal transmission start time. Even in this case, K can be applied as in method 1. In this case, the location of the DMRS symbol transmitted for decoding the second signal may be fixed. If other signals (e.g., an initial signal) other than the DMRS used for determining the uplink signal transmission start time and the DMRS transmitted for decoding the second signal are transmitted in the same symbol, the terminal may transmit the DMRS transmitted for decoding the second signal without transmitting other signals other than the DMRS.

Method 2: Determine uplink signal transmission start time based on received DMRS transmission symbol.

Method 2 is a method of informing a base station of a transmission start time or symbol of a second signal by setting at least one information required for configuring a DMRS signal transmitted for decoding the second signal.

Method 2 will be described in more detail as follows. The terminal receives the first signal configuring the second signal transmission at the slot n and determines the second signal transmission time (e.g., slot n+k) by the received first signal. In addition, the terminal may receive the setting of at least one of the transmission start symbol, the transmission end symbol, and the transmission interval length in the second signal transmission slot n+k based on the received first signal. In other words, the first signal includes a field indicating at least one of the transmission start symbol, the transmission end symbol, and the transmission interval length.

If the uplink transmission is an uplink transmitted to a cell operating in an unlicensed band, the terminal should perform a channel access procedure on the unlicensed band before the set second signal transmission start symbol. If it is determined that the unlicensed band is not in the idle state, when the terminal may receive the setting of at least one second signal transmittable start timing, the terminal sequentially resumes or again performs the channel access procedure at the set second signal transmission start time, and transmits the second signal depending on whether the determined unlicensed band is in the idle state. In this case, if the unlicensed band determined based on the channel access procedure before the second signal transmission start time or the additionally set second signal transmission possible start timing set by the first signal is in the idle state, the terminal may transmit the second signal from the time when the unlicensed band is determined to be in the idle state or the transmission possible time corresponding thereto. In this case, the DMRS transmitted for decoding the second signal in the base station may be transmitted at the fixed location at the second signal transmission slot n+k or the time n+k. In this case, although method 2 will be described under the assumption that the DMRS transmitted for decoding the second signal in the base station is transmitted at a fixed position at the second signal transmission slot n+k or the time n+k, as in the above method 1, method 2 may be applied even to the case in which the DMRS signal may be transmitted in symbols after the K symbol from the second signal transmission start symbol.

The value of K may inform the base station of the transmission start time or the symbol of the second signal by using at least one information required for configuring a DMRS signal transmitted for decoding the second signal. For example, the terminal receives the first signal configuring the second signal transmission at the slot n and determines the second signal transmission time (e.g., slot n+k) by the received first signal. In this case, the terminal may receive the setting of at least one of the transmission start symbol, the transmission end symbol, and the transmission interval length in the second signal transmission slot n+k by the received first signal, and the base station may receive the setting of at least a cyclic shift value among the DMRS-related information and parameters, which are used for the second signal transmission, from the base station by the first signal.

Figure 8:
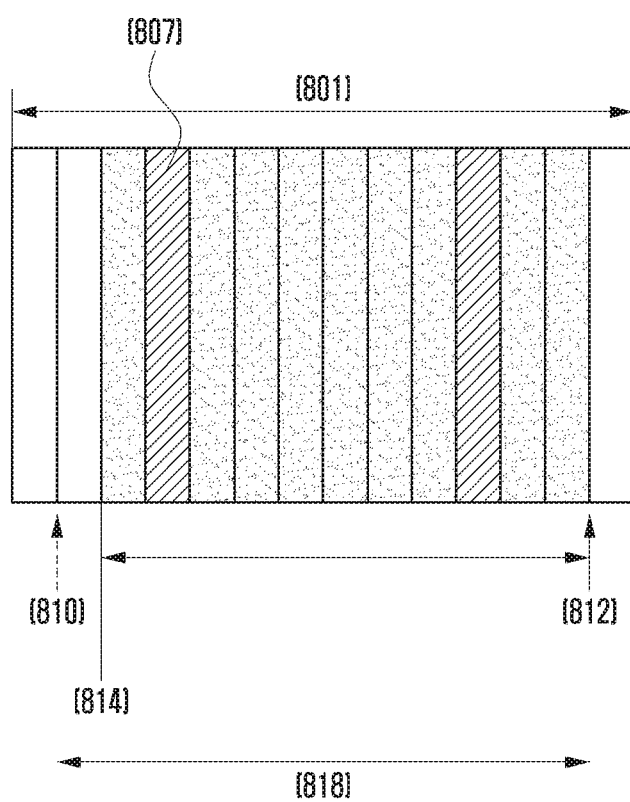
FIG. 8 is a diagram illustrating another method for uplink transmission by a terminal according to various embodiments of the disclosure.

FIG. 8 is a diagram illustrating another method for uplink transmission according to various embodiments of the disclosure.

Referring to FIG. 8, the terminal may be configured to receive the first signal at the time n or the slot n and start to transmit the second signal at the time n+k or in the symbol 810 of the slot n+k 801 according to the received first signal. In this case, the terminal performs the channel access procedure on the unlicensed band in which the second signal transmission is configured before the second signal transmission start symbol. If it is determined that the unlicensed band is in the idle state based on the channel access procedure performed by the terminal immediately before the start of the second signal transmission, the terminal performs the configured second signal transmission in the symbols (or transmission time interval 818) from the set second signal transmission start symbol 810 to the symbol 812 set as the second signal transmission end time.

If the terminal determines that the unlicensed band is not in the idle state by the channel access procedure performed before the second signal transmission start time 810, when it is determined that the terminal is configured to transmit the second signal from the base station at one or more transmission start time, the terminal may additionally resume the channel access procedure until the time additionally set as the second signal transmission start time or before the symbol 814 or again perform a new channel access procedure. In this case, it is also possible to resume or newly perform the channel access procedure immediately before the symbol 814 additionally set as the second signal transmission start time according to the channel access procedure.

If it is determined that the unlicensed band is in the idle state by the channel access procedure performed by the terminal before the additionally set second signal transmission start time 814, the terminal may transmit the second signal from the second signal transmission start time 814.

In this case, it will be described based upon the assumption that the DMRS transmission time or the symbol of the second signal is set by the first signal or fixed between the base station and the terminal, but as in the above method 1, the DMRS transmission time or the symbol may be different according to K. For example, if K=1, the terminal will be able to apply the method 2 even when transmitting the DMRS (807) at the symbol (K=1) immediately following the second signal transmission start possible symbol.

In this case, the terminal may differently configure and transmit at least one of information required for configuring the DMRS signal of the second signal, for example, at least one information of the cyclic shift and a comb value of the DMRS according to the transmission start time or symbol of the second signal.

For example, the terminal may receive the setting of the cyclic shift value X of the DMRS, which is transmitted during the second signal transmission, by the first signal. In this case, the terminal sets the cyclic shift value of the DMRS set by the first signal as the reference value for second signal transmission symbol index 0, and change and transmit the cyclic shift value of the DMRS of the second signal according to Table 5 and the second signal transmission start time or symbol.

In this case, cyclic shift change values a, b, c, d, e, and f of the DMRS according to the second signal transmission start time or symbol and may be a positive or negative number, and may be set to be evenly distributed according to the second signal transmission start time or symbol. In this case, the DMRS cyclic shift change values may be set differently from each other. In addition, in this case, the change value for the terminal may be predefined or may be set by the higher signal from the base station.

As illustrated in FIG. 8, the terminal receives a cyclic shift value X of the DMRS for the second signal transmission by the first signal. The terminal performs the channel access procedure for the second signal transmission, and if the terminal determines that the unlicensed band is in the idle state before the second signal transmission start symbol 814 according to the channel access procedure, the terminal may transmit the second signal in the symbol 814. In this case, the terminal may set the cyclic shift value of the DMRS 807 of the second signal to be modulus ((X+b), maximum CS value) as in the following Table 5 based on the symbol index 0 and transmit the set cyclic shift value. In this case, the base station receiving the DMRS may determine the transmission start time or symbol 814 of the second signal transmitted by the terminal according to the cyclic shift (CS) value of the received DMRS.

TABLE 5

| Symbol Index | Cyclic Shift (CS) value of DMRS |
|---|---|
| 0 | CS value (X) set by first signal |
| 1 | MOD (Value set by first signal + a, maximum CS value or number) |
| 2 | MOD (Value set by first signal + b, maximum CS value or number) |
| 3 | MOD (Value set by first signal + c, maximum CS value or number) |
| 4 | MOD (Value set by first signal + d, maximum CS value or number) |
| 5 | MOD (Value set by first signal + e, maximum CS value or number) |
| 6 | MOD (Value set by first signal + e, maximum CS value or number) |

In this case, the terminal may change and transmit the cyclic shift value of the DMRS according to the second signal transmission start time or symbol as in the following Table 6 based on the second signal transmission start time or symbol (second symbol or symbol index 1) set by the first signal. In this case, cyclic shift change values of the DMRS that are changed according to the second signal transmission start time or symbol may be a positive or negative number, and may be set to be evenly distributed according to the second signal transmission start time or symbol. In this case, the cyclic shift change values of the DMRS may be set differently from each other. In this case, the change value for the terminal may be predefined or may be set by the higher signal from the base station.

As illustrated in FIG. 8, the terminal receives a cyclic shift value X of the DMRS for the second signal transmission by the first signal. The terminal performs the channel access procedure for the second signal transmission, and if the terminal determines that the unlicensed band is in the idle state before the second signal transmission start symbol 814 according to the channel access procedure, the terminal may transmit the second signal in the symbol 814. In this case, the terminal may set the cyclic shift value of the DMRS 807 of the second signal modulus (X+a), maximum CS value) as shown in the following Table 6 based on the second signal transmission start symbol index 1 810 and transmitted. In this case, the base station receiving the DMRS may determine the transmission start time or symbol 814 of the second signal transmitted by the terminal according to the CS value of the received DMRS.

TABLE 6

| Symbol Index | Cyclic Shift (CS) value of DMRS |
|---|---|
| 0 | MOD (CS value set by first signal + f (or −g), maximum CS value or number) |
| 1 | CS value (X) set by first signal |
| 2 | MOD (Value set by first signal + a, maximum CS value or number) |
| 3 | MOD (Value set by first signal + b, maximum CS value or number) |
| 4 | MOD (Value set by first signal + c, maximum CS value or number) |
| 5 | MOD (Value set by first signal + d, maximum CS value or number) |
| 6 | MOD (Value set by first signal + e, maximum CS value or number) |

Similarly to the case where the base station and the terminal determine the second signal transmission start time or symbol based on the CS value, the terminal may differently set and transmit the comb value of the DMRS required for configuring the DMRS signal of the second signal according to the transmission start time or symbol of the second signal.

For example, the terminal may receive the setting of the comb value X of the DMRS, which is transmitted during the second signal transmission, by the first signal. In this case, the terminal may set the comb value of DMRS set by the first signal as the reference value for the second signal transmission symbol index 0 as shown in the following Table 7, or may change and transmit the comb value of the DMRS of the second signal according to the second signal transmission start symbol set by the first signal and the second signal transmission start time or symbol based on the comb value of the DMRS set by the first signal as shown in the following Table 8.

In this case, the comb change values a, b, c, d, e, and f of the DMRS that are changed according to the second signal transmission start time or symbol may be a positive or negative number, and may be set to be evenly distributed according to the second signal transmission start time or symbol. In this case, the comb change values of the DMRS may be set differently from each other. In addition, in this case, the change value for the terminal may be predefined or may be set by the higher signal from the base station. The method for determining the transmission start timing or symbol of the second signal using the comb values of the DMRS may be explained based on the case of using the cyclic shift values of the DMRS, and therefore the detailed description thereof will be omitted.

TABLE 7

| Symbol Index | Cyclic Shift (CS) value of DMRS |
|---|---|
| 0 | MOD (Value set by first signal + f (or −g), maximum CS value or number) |
| 1 | CS value set by first signal |
| 2 | MOD (Value set by first signal + a, maximum CS value or number) |
| 3 | MOD (Value set by first signal + b, maximum CS value or number) |
| 4 | MOD (Value set by first signal + c, maximum CS value or number) |
| 5 | MOD (Value set by first signal + d, maximum CS value or number) |
| 6 | MOD (Value set by first signal + e, maximum CS value or number) |

TABLE 8

| Symbol Index | Comb value of DMRS |
|---|---|
| 0 | MOD (Value set by first signal + f (or −g), maximum Comb value or number) |
| 1 | Comb value set by first signal |
| 2 | MOD (Value set by first signal + a, maximum Comb value or number) |
| 3 | MOD (Value set by first signal + b, maximum Comb value or number) |
| 4 | MOD (Value set by first signal + c, maximum Comb value or number) |
| 5 | MOD (Value set by first signal + d, maximum Comb value or number) |
| 6 | MOD (Value set by first signal + e, maximum Comb value or number) |

Method 3: Determine based on uplink signal transmission start time information received in second signal region.

The method 3 is for additionally informing the base station of information on the transmission start time or symbol of the second signal at the time of the second signal transmission.

The method 3 will be described in more detail as follows. The terminal receives the first signal configuring the second signal transmission at the slot n and determines the second signal transmission time (e.g., slot n+k) by the received first signal. In addition, the terminal may receive the setting of at least one of the transmission start symbol, the transmission end symbol, and the transmission interval length in the second signal transmission slot n+k through the received first signal. In other words, the first signal includes a field indicating at least one of the transmission start symbol, the transmission end symbol, and the transmission interval length.

If the uplink transmission is transmitted to a cell operating in an unlicensed band, the terminal should perform a channel access procedure on the unlicensed band before the set second signal transmission start symbol. If it is determined that the unlicensed band is not in the idle state, when the terminal may receive the setting of at least one second signal transmission start time, the terminal sequentially resume or re-perform the channel access procedure on the set second signal transmission start time in the first signal, and transmit the second signal depending on whether the unlicensed band is in the idle state.

In this case, if the unlicensed band determined by the channel access procedure before the second signal transmission start time or the additional second signal transmittable start timing set by the first signal is in the idle state, the terminal may transmit the second signal from the time when the unlicensed band is determined to be in the idle state or the transmission start possible time corresponding thereto. In this case, the terminal may transmit the information on the second signal transmission start time or symbol to the base station along with transmitting the second signal (e.g., PUCCH).

Figure 9:
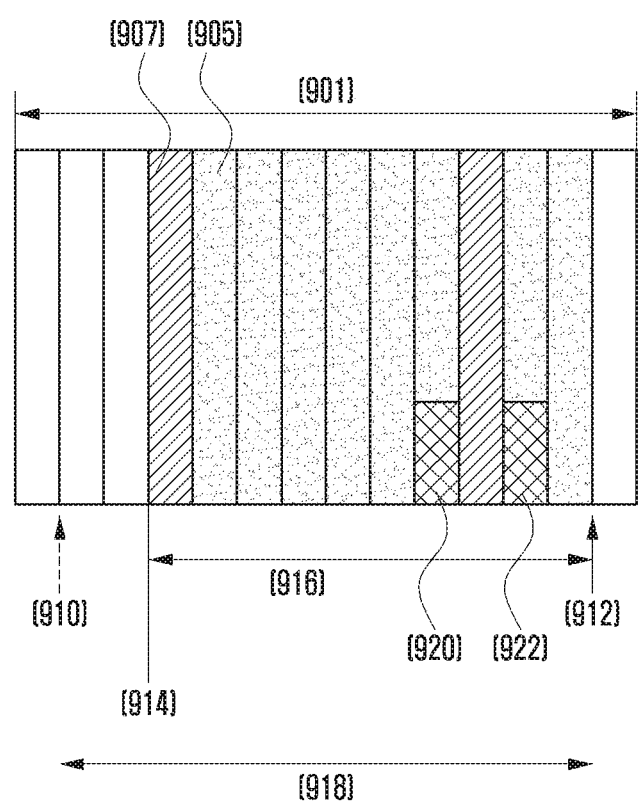
FIG. 9 is a diagram illustrating another method for uplink transmission by a terminal according to various embodiments of the disclosure.

FIG. 9 is a diagram illustrating another method for uplink transmission by a terminal according to various embodiments of the disclosure.

Referring to FIG. 9, the terminal receives the first signal configuring the second signal transmission at the slot n and determines the second signal transmission time by the received first signal. In addition, the terminal may receive the setting of at least one of a transmission start symbol 910, a transmission end symbol 912, and a transmission interval length 918 in the second signal transmission time by the received first signal. In other words, the first signal transmitted by the base station to configure the second signal transmission to the terminal includes a field indicating at least one of the transmission start symbol 910, the transmission end symbol 912, and the transmission interval length 918. If the uplink transmission is an uplink transmitted to a cell operating in an unlicensed band, the terminal should perform a channel access procedure on the unlicensed band before the set second signal transmission start symbol. If it is determined that the unlicensed band is not in the idle state, when the terminal may receive the setting of at least one second signal transmittable start timing 910 and 914, the terminal sequentially resumes or re-performs the channel access procedure on the set second signal transmission start time in the first signal, and transmits the second signal depending on whether the unlicensed band is in the idle state.

In this case, if the unlicensed band determined by the channel access procedure before the second signal transmission start time 910 or the additional second signal transmittable start timing 914 set by the first signal is in the idle state, the terminal may transmit the second signal from the time when the unlicensed band is determined to be in the idle state or the transmission start possible time corresponding thereto. In this case, the terminal may transmit the information 920 on the second signal transmission start time or symbol to the base station along with transmitting the second signals 905 and 907.

In this case, the size or the number of bits of the information 920 and 922 on the second signal transmission start time or symbol may be predefined between the base station and the terminal or the terminal may receive the setting by the higher signal from the base station. In this case, the size or the number of bits of the information 920 and 922 on the second signal transmission start time or symbol may be changed differently according to the second signal transmission start possible time or the number of symbols set by the terminal. For example, when the terminal receives the setting of four second signal transmission start possible time or the number of symbols, the size or the number of bits of the information 920 and 922 on the second signal transmission start time or symbol may consist of 2 bits.

If all the symbols of a slot 901 consisting of 14 symbols are defined as the second signal transmission start time or symbol, or in the case of the terminal configured by the higher signal, the size or the number of bits of the information 920 and 922 on the second signal transmission start time or symbol may consist of 4 bits.

In this case, the information 920 and 922 on the second signal transmission start time or symbol can be transmitted by puncturing some of the second signals (for example, PUSCH). The time or symbol at which the terminal starts transmitting the second signal is changed depending on the result of the channel access procedure. In other words, the terminal receives the first signal which sets or schedules the transmission time or the slot 901 for the second signal from the base station. The terminal receives the setting of the transmission start symbol 910, the transmission end symbol 912, the transmission interval length 918 or the like of the second signal by the received first signal, and generates the second signal corresponding to the transmission interval length 918 set by the first signal before the transmission start symbol 910 of the second signal. In other words, the terminal generates the second signal set by the first signal from the base station.

If the terminal determines that the unlicensed band is not in the idle state by the channel access procedure performed before the set second signal transmission start symbol 910, the terminal may continue or again perform the channel access procedure before the additionally set second signal transmission start symbol 914. If it is determined that the unlicensed band is in the idle state by the channel access procedure performed before the set second signal transmission start symbol 914, the terminal may puncture some of the already generated second signals to transmit the second signal from the second signal transmission start symbol 914 to the second signal transmission end symbol 912. In this case, the terminal may regenerate (or re-encode) the second signal from the second signal transmission start symbol 914 to the second signal transmission end symbol 912, that is, the transmission interval 916. However, generally, since the terminal is required to generate or regenerate signals over a certain period of time, in the case of the system which should transmit signals immediately after the channel access procedure like the signal transmission in the unlicensed band, a puncturing scheme is more suitable.

Similarly, if the terminal transmits the information on the second signal transmission start time or symbol 914 along with the second signal, since the terminal may not determine the second signal transmission start time or symbol 914 before the generation of the second signal, the terminal preferably transmits the information on the second signal transmission start time or symbol 914 or the symbol 914 by puncturing the already generated second signal.

In this case, the information on the second signal transmission start time or symbol 914 can be transmitted from the second signal transmission start time or symbol 914 in the second signal transmission end time or any symbol of the symbols 912. However, as described above, since the terminal cannot know the information on the second signal transmission start time or symbol 914 in advance, it takes a certain time or more to generate the information on the second signal transmission start time or symbol. Accordingly, it is preferable to transmit the information on the second signal start timing or symbol as late as possible, for example, the last symbol 914 in the second signal transmission start time or symbol 914 to the second signal transmission end time or the symbol 912. In addition, generally, the base station performs a channel estimation operation for decoding the second signal using the DMRS 907 of the second signal transmitted by the terminal. Generally, since the channel estimation performance in symbols adjacent to the DMRS 907 is high, a signal adjacent to the DMRS 907 of the second signal is highly likely to be correctly decoded. Therefore, it is preferable that the information on the second signal transmission start time or symbol is transmitted from the information 920 and 922, which are in symbols adjacent to the DMRS 907 of the second signal.

In this case, the information on the second signal transmission start time or symbol may be transmitted in one symbol among the symbols adjacent to the DMRS 907 of the second signal, for example, the information 922 is transmitted in a symbol as late as possible according to the transmission scheme. In this case, the information 920 and 922 on the second signal transmission start time or symbol can be repeatedly transmitted in all the symbols adjacent to the DMRS 907 of the second signal. Also, it is not excluded that information on the second signal transmission start time or symbol is transmitted adjacent to the first signal transmission time or the first DMRS symbol transmitted at the slot 901.

In addition, method 3 can configure or determine the information on the second signal transmission start time or symbol of the base station and the terminal in a combination with at least one of method 1 and method 2.

Figure 10:
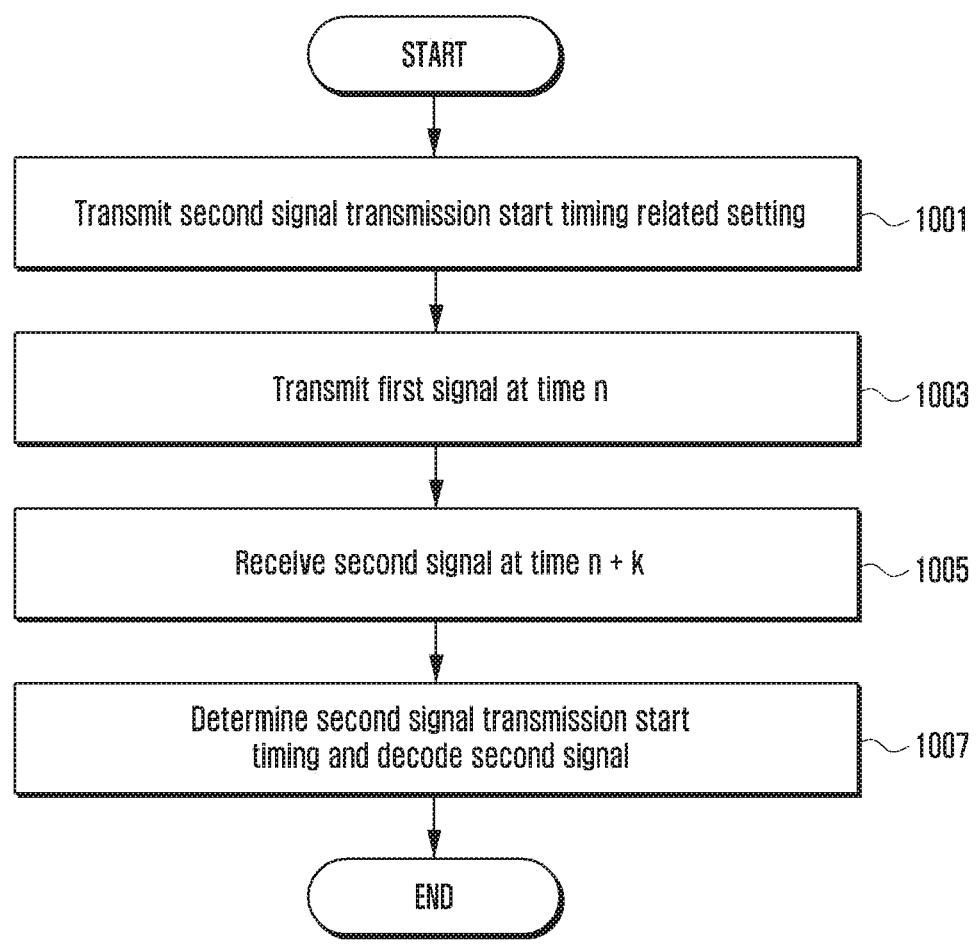
FIG. 10 is a flowchart illustrating an operation of a base station according to various embodiments of the disclosure.

FIG. 10 is a flowchart illustrating an operation of a base station according to various embodiments of the disclosure.

Referring to FIG. 10, at operation 1001, the base station configures the configuration information, which is related to the second signal transmission of the terminal, in the terminal by the higher signal, including the information on the second signal transmittable start timing or symbol. In this case, the second signal transmittable start timing or symbol may include at least one symbol value or a symbol index that the terminal may transmit the second signal within for example, a slot or a subframe, and can be set to transmit the second signal in all the symbols within the predetermined interval or the slot. The base station that receives the scheduling request for the uplink signal transmission from the terminal or receives specific information from the terminal on the uplink, such as channel quality information, transmits, at operation 1003, the first signal at time or slot n to configure the uplink signal transmission of the terminal at time or slot n+k. In this case, the first signal may be transmitted by including at least one of the second signal transmission start symbol or slot, the second signal transmission end symbol or slot, and the information on the second signal transmission interval (symbol or slot).

As described above, the base station that configures the second signal transmission by the first signal receives, at operation 1005, the second signal transmission of the terminal at the time or slot n+k at which the second signal transmission is configured.

The base station may determine, at operation 1007, the actual transmission start time or symbol of the received second signal by at least one of the methods 1, 2, and 3.

Figure 11:
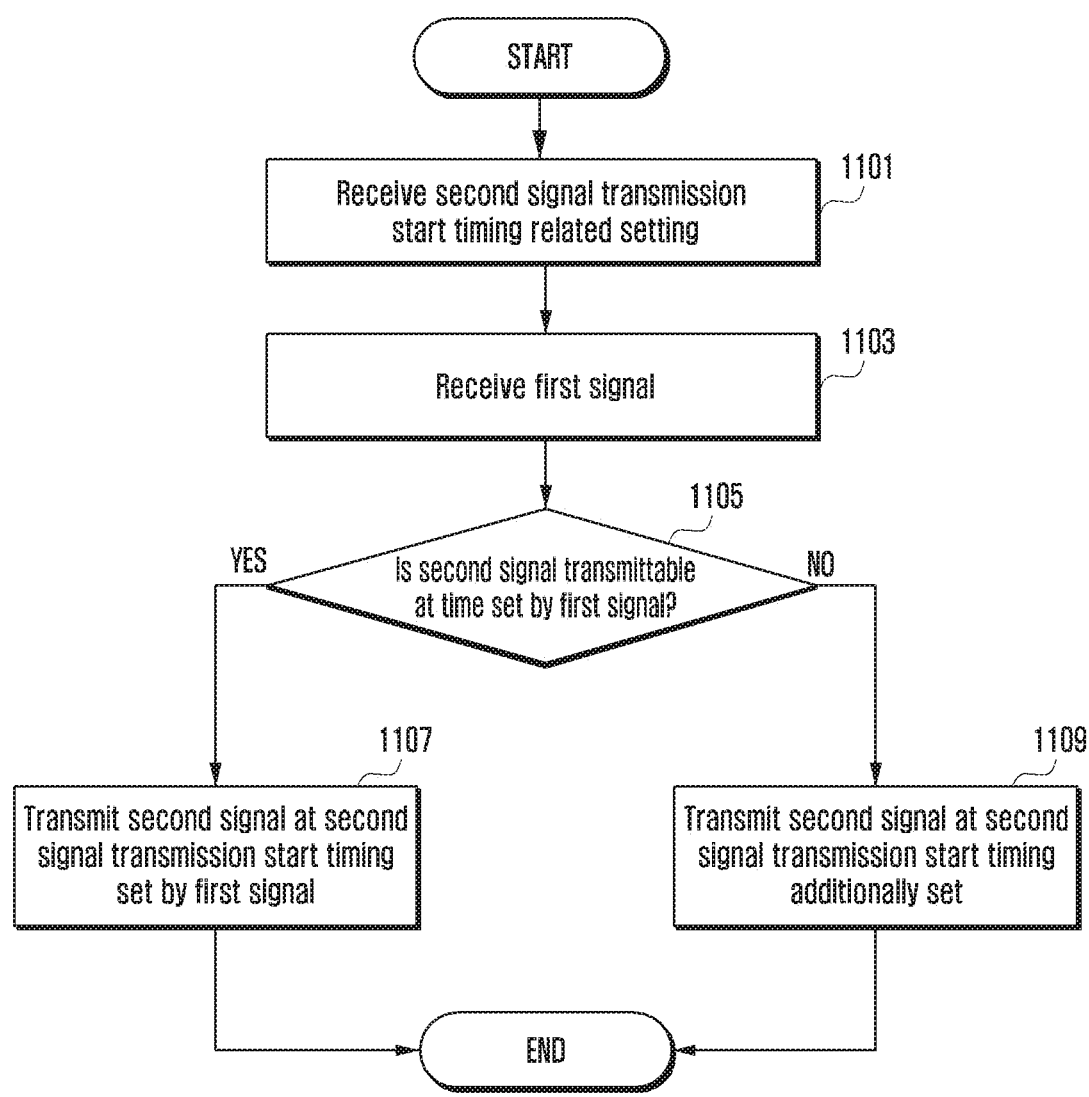
FIG. 11 is a flowchart illustrating an operation of a terminal according to various embodiments of the disclosure.

FIG. 11 is a flowchart illustrating an operation of a terminal according to various embodiments of the disclosure.

Referring to FIG. 11, at operation 1101, the terminal receives the setting of the configuration information, which is related to the second signal transmission, from the base station by the higher signal, including the information on the second signal transmission start time or symbol. In this case, the second signal transmission start time or symbol may include a symbol value or a symbol index that the terminal may transmit the second signal within a predetermined interval, for example, a slot or a subframe, and can be set to transmit the second signal in all the symbols within the predetermined interval.

The terminal that transmits the scheduling request for the uplink signal transmission to the base station or receives a request to transmit specific information on an uplink, such as channel quality information, from the base station receives the first signal in the time or slot n at operation 1103, thereby receiving the setting to perform the uplink signal transmission in the slot n+k. In this case, the first signal may include at least one of the second signal transmission start symbol or slot, the second signal transmission end symbol or slot, and the information on the second signal transmission interval (symbol or slot).

As described above, the terminal receiving the setting of the second signal transmission in the time n+k by the first signal transmits the second signal in the second signal transmission start symbol set by the first signal in the second signal transmission time or the slot n+k. If the second signal transmission is the uplink transmission to the cell operating in the unlicensed band, the terminal may perform the channel access procedure on the unlicensed band before the time when the second signal transmission is set and may perform or may not perform the second signal transmission based on the result of the channel access procedure.

If the terminal performing the channel access procedure determines that the second signal transmission set by the first signal is possible at operation 1105, the terminal transmits the second signal at the second signal transmission start time set by the first signal.

If the terminal performing the channel access procedure determines that the second signal transmission is impossible at the time set by the first signal at operation 1105, the terminal may perform the channel access procedure until the second signal transmission start time additionally set other than the second signal transmission start time set by the first signal, and transmit the second signal from the second signal transmission start time additionally set according to the channel access procedure result at operation 1107).

If the channel access procedure is performed until the second signal transmission start time additionally set and the second signal cannot be transmitted through the channel access procedure result, the terminal in which the second signal transmission start time other than the second signal transmission start time is additionally set again performs the channel access procedure to repeat the above operations. In this case, the terminal capable of transmitting the second signal from the second signal transmission start time additionally set at operation 1109 may transmit the actual transmission start time or symbol of the second signal to the base station by at least one of the methods 1, 2, and 3.

In order to perform the above-described embodiments of the disclosure, a transmitter, a receiver, and a processor of the terminal and the base station are each shown below with reference to FIGS. 12 and 13. In order to perform the method for informing second signal transmission start time or symbol according to the disclosure, a method for transmitting/receiving a base station and a terminal are shown.

Figure 12:
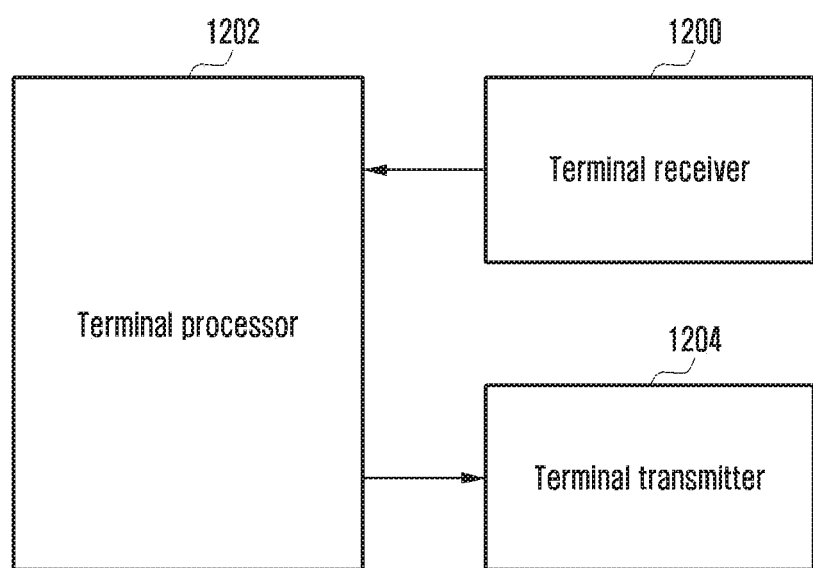
FIG. 12 is a block diagram illustrating a structure of a terminal according to various embodiments of the disclosure.

FIG. 12 is a block diagram illustrating a structure of a terminal according to various embodiments of the disclosure.

Referring to FIG. 12, the terminal according to the embodiment of the disclosure may include a terminal receiver 1200, a terminal transmitter 1204, and a terminal processor 1202. The terminal receiver 1200 and the terminal transmitter 1204 are collectively referred to as a transceiver in the embodiment of the disclosure.

The transceiver may transmit/receive a signal to/from the base station. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the terminal processor 1202 and transmit the signal output from the terminal processor 1202 on the radio channel.

The terminal processor 1202 may control a series process to operate the terminal according to the embodiment of the disclosure as described above. For example, the terminal receiver 1200 may receive the signal including the control signal, and the terminal processor 1202 may set the second signal transmission start time or the like.

Thereafter, if the terminal transmitter 1204 needs to transmit a second signal related to the control signal at the above timing, it transmits the second signal at a timing determined by the terminal processor 1202.

Figure 13:
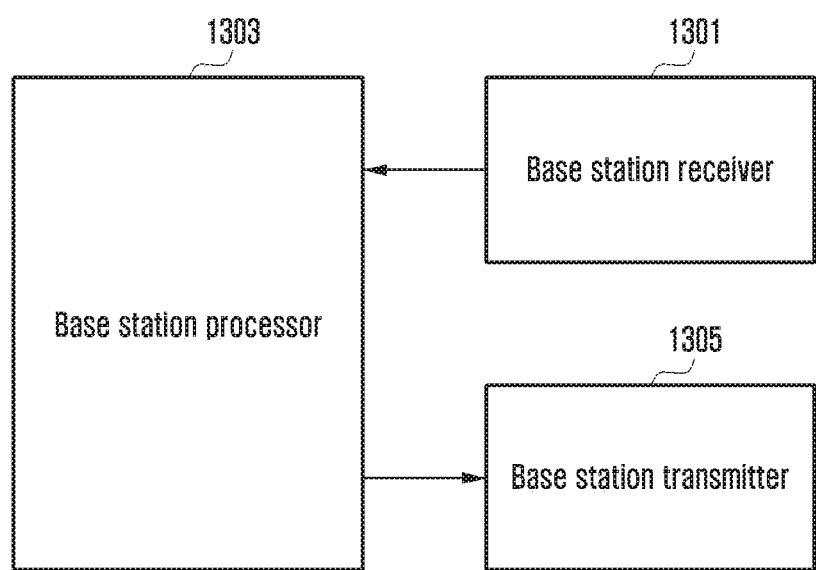
FIG. 13 is a block diagram illustrating a structure of a base station according to various embodiments of the disclosure.

FIG. 13 is a block diagram illustrating a structure of a base station according to various embodiments of the disclosure.

Referring to FIG. 13, the base station of the disclosure may include a base station receiver 1301, a base station transmitter 1305, and a base station processor 1303. The base station receiver 1301 and the base station transmitter 1305 are collectively referred to as a transceiver in the embodiment of the disclosure.

The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the base station processor 1303 and transmit the signal output from the base station processor 1303 on the radio channel.

The base station processor 1303 may control a series process to operate the base station according to the embodiment of the disclosure as described above.

Meanwhile, in the drawings illustrating a method in embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:
   receiving, from a base station, downlink control information (DCI) including information on a first transmission starting position in a subframe for an unlicensed band for an uplink signal of a terminal;
   performing a channel access in the unlicensed band;
   in case that a channel in the unlicensed band is not accessible by the terminal before the first transmission starting position based on a channel access result, performing the channel access until a second transmission starting position in the subframe; and
   in case that the channel in the unlicensed band is accessible by the terminal before the second transmission starting position, transmitting the uplink signal from the second transmission starting position,
   wherein uplink data in resource elements before the second transmission starting position is punctured in case that the uplink signal is transmitted from the second transmission starting position.

2. The method of claim 1, wherein the transmitting of the uplink signal comprises:
   transmitting a demodulation reference signal (DMRS) at a location determined based on the second transmission starting position.

3. The method of claim 1,
   wherein the second transmission starting position is a predetermined symbol position, and
   wherein the predetermined symbol position includes a position of an eighth symbol.

4. The method of claim 1, wherein the information further includes a PUSCH ending symbol.

5. A method of a base station in a wireless communication system, the method comprising:
   transmitting, to a terminal, downlink control information (DCI) including information on a first transmission starting position in a subframe for an unlicensed band for an uplink signal;
   in case that a channel in the unlicensed band is accessible by the terminal, receiving the uplink signal at the first transmission starting position from the terminal, wherein, in case that the channel in the unlicensed band is not accessible by the terminal, a channel access is performed until a second transmission starting position in the subframe; and
   in case that the channel in the unlicensed band is accessible by the terminal before the second transmission starting position, receiving the uplink signal from the second transmission starting position from the terminal,
   wherein uplink data in resource elements before the second transmission starting position is punctured in case that the uplink signal is received from the second transmission starting position.

6. The method of claim 5, wherein the receiving of the uplink signal at the second transmission starting position further comprises receiving a demodulation reference signal (DMRS) at a position determined based on the second transmission starting position.

7. The method of claim 6,
   wherein the second transmission starting position is a predetermined symbol position, and
   wherein the predetermined symbol position includes a position of an eighth symbol.

8. The method of claim 5, wherein the information further includes a PUSCH ending symbol.

9. A terminal in a wireless communication system, the terminal comprising:
   a transceiver; and
   at least one processor configured to:
   receive, from a base station, downlink control information (DCI) including information on a first transmission starting position in a subframe for an unlicensed band for an uplink signal of the terminal,
   perform a channel access in the unlicensed band,
   in case that a channel in the unlicensed band is not accessible by the terminal before the first transmission starting position based on a channel access result, perform the channel access until a second transmission starting position in the subframe, and
   in case that the channel in the unlicensed band is accessible by the terminal before the second transmission starting position, transmit the uplink signal from the second transmission starting position,
   wherein uplink data in resource elements before the second transmission starting position is punctured in case that the uplink signal is transmitted from the second transmission starting position.

10. The terminal of claim 9, wherein the at least one processor is further configured to:
    transmit a demodulation reference signal (DMRS) at a position determined based on the second transmission starting position.

11. The terminal of claim 9,
    wherein the second transmission starting position is a predetermined symbol position, and
    wherein the predetermined symbol position includes a position of an eighth symbol.

12. The terminal of claim 9, wherein the information further includes a PUSCH ending symbol.

13. A base station in a wireless communication system, the base station comprising:
    a transceiver; and
    at least one processor configured to:
    transmit, to a terminal, downlink control information (DCI) including information on a first transmission starting position in a subframe for an unlicensed band for an uplink signal,
    in case that a channel in the unlicensed band is accessible by the terminal, receive the uplink signal at the first transmission starting position from the terminal,
    wherein, in case that the channel in the unlicensed band is not accessible by the terminal, a channel access is performed until a second transmission starting position in the subframe, and in case that the channel in the unlicensed band is accessible by the terminal before the second transmission starting position, receive the uplink signal from the second transmission starting position from the terminal, wherein uplink data in resource elements before the second transmission starting position is punctured in case that the uplink signal is received from the second transmission starting position.

14. The base station of claim 13, wherein the at least one processor is further configured to receive a demodulation reference signal (DMRS) at a location determined based on the second transmission starting position.

15. The base station of claim 14, wherein the second transmission starting position is a predetermined symbol position, and wherein the predetermined symbol position includes a position of an eighth symbol.

16. The base station of claim 13, wherein the information further includes a PUSCH ending symbol.

* * * * *